United States Patent
Bae et al.

(10) Patent No.: US 11,310,685 B2
(45) Date of Patent: Apr. 19, 2022

(54) ELECTRONIC DEVICE TO SUPPORT DUAL CONNECTIVITY AND OPERATING METHOD THEREOF

(71) Applicant: Samsung Electronics Co., Ltd., Suwon-si (KR)

(72) Inventors: Yungyu Bae, Suwon-si (KR); Yongsang Cho, Suwon-si (KR); Jiyoung Cha, Suwon-si (KR); Sangho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 16/905,138

(22) Filed: Jun. 18, 2020

(65) Prior Publication Data

US 2021/0037405 A1 Feb. 4, 2021

(30) Foreign Application Priority Data

Jul. 31, 2019 (KR) .................. 10-2019-0093399

(51) Int. Cl.
*H04W 76/16* (2018.01)
*H04W 24/10* (2009.01)
*H04W 88/06* (2009.01)

(52) U.S. Cl.
CPC .......... *H04W 24/10* (2013.01); *H04W 76/16* (2018.02); *H04W 88/06* (2013.01)

(58) Field of Classification Search
CPC ..... H04W 76/16; H04W 88/06; H04W 76/19; H04W 48/18
See application file for complete search history.

(56) References Cited

U.S. PATENT DOCUMENTS

| 2016/0014706 | A1* | 1/2016 | Vajapeyam | H04W 24/10 370/328 |
| 2016/0242064 | A1* | 8/2016 | Lee | H04W 56/0005 |
| 2017/0195996 | A1 | 7/2017 | Fujishiro | |
| 2017/0230232 | A1 | 8/2017 | Liu et al. | |

(Continued)

FOREIGN PATENT DOCUMENTS

WO 2018/064483 A1 4/2018

OTHER PUBLICATIONS

International Search Report dated Sep. 25, 2020, issued in International Application No. PCT/KR2020/007909.

*Primary Examiner* — Chuong A Ngo
(74) *Attorney, Agent, or Firm* — Jefferson IP Law, LLP

(57) ABSTRACT

An electronic device is provided. The electronic device includes a first communication processor and a second communication processor, the second communication processor is configured to receive, from the first communication processor, a first report condition for measurement information for a signal from at least one which corresponds to a second network communication, identify a second report condition which corresponds to connection failure of the electronic device to a first base station corresponding to the second network communication, and transfer the first measurement information to the first communication processor, and the first communication processor is configured to transmit, to a base station corresponding to a first network communication, the first measurement information received from the second communication processor.

22 Claims, 30 Drawing Sheets

(56) References Cited

U.S. PATENT DOCUMENTS

| | | |
|---|---|---|
| 2018/0270682 A1 | 9/2018 | Zacharias et al. |
| 2018/0368009 A1 | 12/2018 | Xia et al. |
| 2019/0059012 A1 | 2/2019 | Nam et al. |
| 2021/0153218 A1* | 5/2021 | Wang .................... H04W 76/15 |

* cited by examiner

ELECTRONIC DEVICE TO SUPPORT DUAL CONNECTIVITY AND OPERATING METHOD THEREOF

CROSS-REFERENCE TO RELATED APPLICATION(S)

This application is based on and claims priority under 35 U.S.C. § 119(a) of a Korean patent application number 10-2019-0093399, filed on Jul. 31, 2019, in the Korean Intellectual Property Office, the disclosure of which is incorporated by reference herein in its entirety.

BACKGROUND

1. Field

The disclosure relates to an electronic device to support dual connectivity and an operating method thereof.

2. Description of Related Art

Along with the development of mobile communication technology, portable terminals equipped with various functions have recently become popular, and efforts have been made to develop 5th generation (5G) communication systems to meet the increasing demands for wireless data traffic. In order to achieve high data rates, implementation of 5G communication systems in ultra-high frequency bands as well as in the high frequency bands used in 3rd generation (3G) and long term evolution (LTE) is under consideration to provide faster data rates.

For implementation of 5G communication, a stand-alone (SA) scheme and a non-stand-alone (NSA) scheme are considered. The NSA scheme enables use of a new radio (NR) system together with the legacy LTE system. In the NSA scheme, a user equipment (UE) may communicate with a next-generation Node B (gNB) (or a secondary next-generation Node B (SgNB)) of the NR system as well as an evolved Node B (eNB) of the LTE system. A technology that enables a UE to use heterogeneous communication systems may be referred to as dual connectivity.

Dual connectivity was first proposed under $3^{rd}$ generation partnership project (3GPP) Release-12. The first proposed dual connectivity was for using a 3.5 GHz frequency band as a small cell in addition to the LTE system. In the 5G NSA scheme, implementation of the dual connectivity suggested by 3GPP Release-12 by using the LTE system as a master node and the NR system as a secondary node is under consideration.

A UE may receive a radio resource control (RRC) connection reconfiguration message from a master node (MN) (e.g., an eNB), and identify a report condition for measurement information based on information in the RRC connection reconfiguration message. For example, the UE may identify a report configuration based on the information in the RRC connection reconfiguration message, and the report configuration may include a triggering event and a report duration. The UE may report measurement information which corresponds to a measurement object to the MN according to a trigger that a specific event (e.g., a B1 event) occurs.

The above information is presented as background information only to assist with an understanding of the disclosure. No determination has been made, and no assertion is made, as to whether any of the above might be applicable as prior art with regard to the disclosure.

SUMMARY

If a triggering event is set to a B1 event and measurement information corresponding to a measurement object is greater than a threshold value in a radio resource control (RRC) connection reconfiguration message, a user equipment (UE) may report the measurement information to an MN. Thereafter, the UE may perform a random access channel (RACH) procedure with a secondary node (SN) selected by the MN. In some cases, the RACH procedure by the UE with the selected SN may fail. Alternatively, the UE may release a connection from the SN after establishing the connection with the SN. In this case, the UE is likely to perform the RACH procedure again for the SN based on detection of a B1 event. So, the UE continuously attempts to establish a connection with an SN having a high probability of failure in the RACH procedure and/or a connection release, thereby resources and power of the UE may be wasted.

Aspects of the disclosure are to address at least the above-mentioned problems and/or disadvantages and to provide at least the advantages described below. Accordingly, an aspect of the disclosure is to provide an electronic device capable of adjusting a report condition from a report condition received from an MN (e.g., a report condition in an RRC connection reconfiguration message) to another report condition, and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a first communication processor configured to support a first network communication with a first network, and a second communication processor configured to support a second network communication with a second network different from the first network. The second communication processor configured to: receive, from the first communication processor, a first report condition for measurement information for a signal from at least one base station which corresponds to the second network communication, identify a second report condition which corresponds to connection failure of the electronic device to a first base station corresponding to the second network communication, based on identification of the connection failure to the first base station, in a case that first measurement information for a signal from the first base station satisfies the second report condition, transfer the first measurement information to the first communication processor, and, based on a fact that the connection failure to the first base station is not identified, in a case that the first measurement information for the signal from the first base station satisfies the first report condition, transfer the first measurement information to the first communication processor, and the first communication processor configured to transmit, to a base station which corresponds to the first network communication, the first measurement information received from the second communication processor.

In accordance with another aspect of the disclosure, an electronic device is provided. The electronic device includes a first communication processor configured to support a first network communication with a first network, and a second communication processor configured to support a second network communication with a second network different from the first network. The second communication processor configured to: receive, from the first communication processor, a first report condition for measurement information for a signal from at least one base station which corresponds to the second network communication, identify a second report condition which corresponds to a connection release of the electronic device from a first base station corresponding to the second network communication, in a case that first measurement information for a signal from the first base station satisfies the second report condition based on identification of a connection release from the first base station after a connection to the first base station is established, transfer the first measurement information to the first communication processor, and in a case that the first measurement information for the signal from the first base station satisfies the first report condition based on a fact that the connection release from the first base station is not identified, transfer the first measurement information to the first communication processor, and the first communication processor configured to transmit, to a base station which corresponds to the first network communication, the first measurement information received from the second communication processor.

In accordance with another aspect of the disclosure, an electronic device is provided. The electronic device includes a first communication processor configured to support a first network communication with a first network, and a second communication processor configured to support a second network communication with a second network different from the first network. The second communication processor configured to: receive, from the first communication processor, a first threshold value for identifying whether to report information for a signal from at least one base station which corresponds to the second network communication, in a case that connection failure to a first base station which corresponds to the second network communication is not identified, transfer, to the first communication processor, a first measurement value for a signal from a first base station to report the first measurement value based on the first measurement value being greater than the first threshold value, and in a case that the connection failure to the first base station is identified, transfer the first measurement value to the first communication processor to report the first measurement value based on the first measurement value being greater than a second threshold value related to the connection failure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
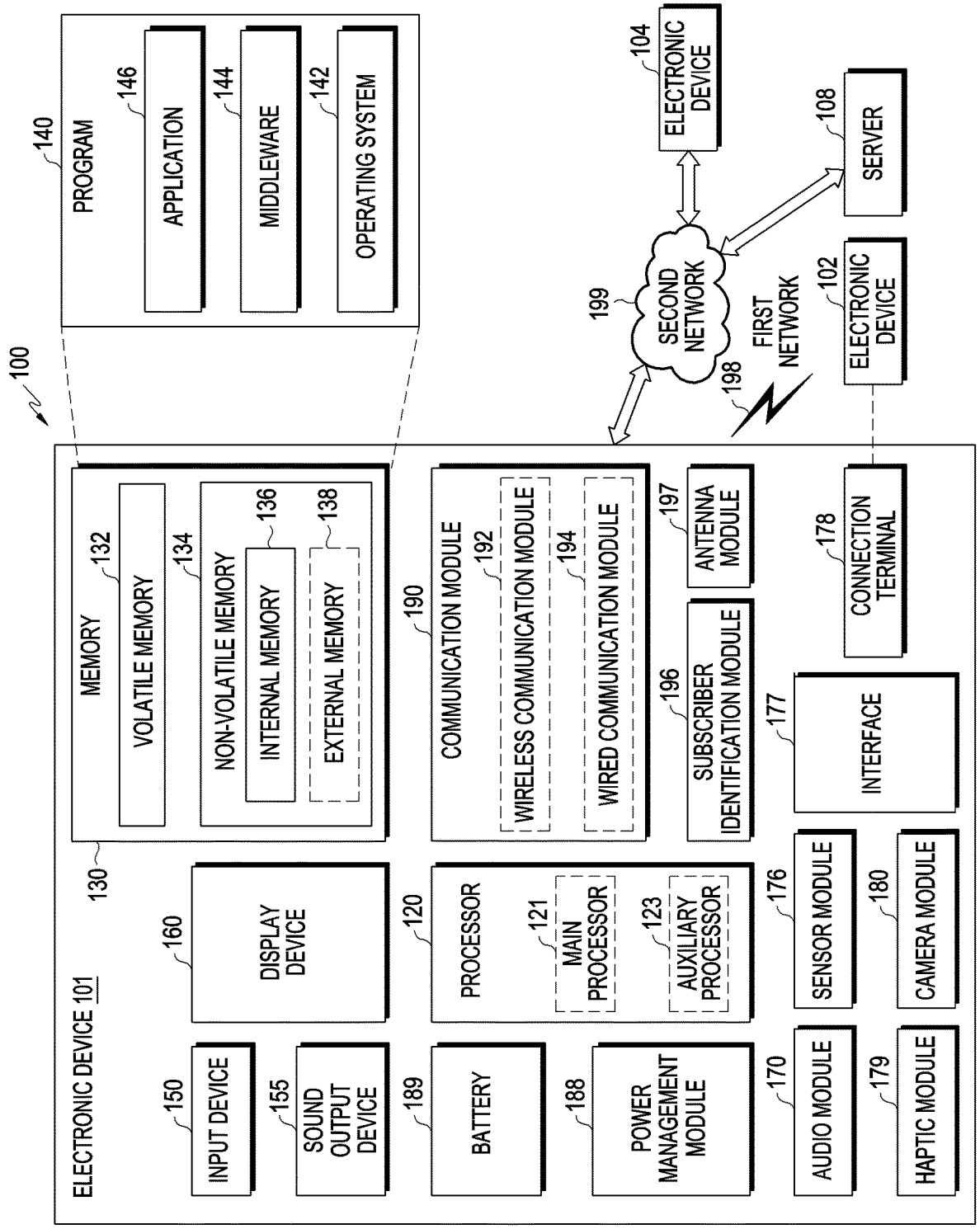
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
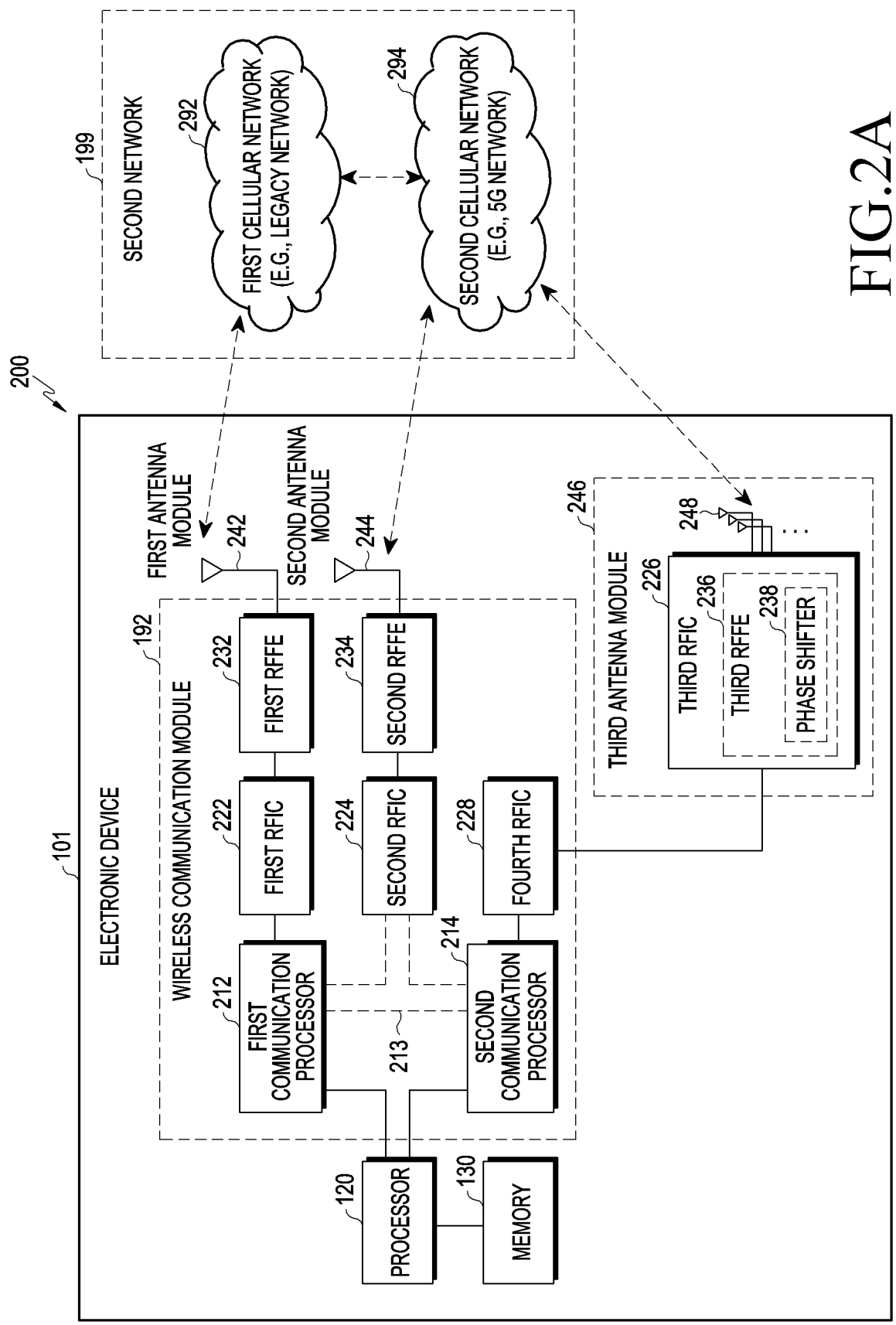
FIG. 2A is a block diagram of an electronic device for supporting a legacy network communication and a 5th generation (5G) network communication according to an embodiment of the disclosure.

FIG. 2A is a block diagram illustrating an electronic device for supporting a legacy network communication and a 5th generation (5G) network communication according to an embodiment of the disclosure.

Referring to FIG. 2A, in a network environment 200, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 199 may include a first network 292 and a second network 294. According to another embodiment, the electronic device 101 may further include at least one of the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to another embodiment, the fourth RFIC 228 may be omitted or included as part of the third RFIC 226.

The first communication processor 212 may establish a communication channel in a band to be used for a wireless communication with the first network 292 and support a legacy network communication through the established communication channel. According to various embodiments, the first network 292 may be a legacy network including a $2^{nd}$ generation (2G), 3rd generation (3G), $4^{th}$ generation (4G), or LTE network. The second communication processor 214 may establish a communication channel corresponding to a specified band (e.g., about 6 GHz to about 60 GHz) out of a band to be used for a wireless communication with the second network 294 and support a 5G network communication through the established communication channel. According to various embodiments, the second network 294 may be a 5G network defined by the 3GPP. Additionally, according to an embodiment, the first communication processor 212 or the second communication processor 214 may establish a communication channel corresponding to another specified band (e.g., about 6 GHz or less) out of the band to be used for the wireless communication with the second network 294 and support a 5G network communication through the established communication channel.

The first communication processor 212 may transmit and receive data to and from the second communication processor 214. For example, data supposed to be transmitted through a second network 294 may be scheduled to be transmitted through a first network 292. In this case, the first communication processor 212 may receive transmission data from the second communication processor 214.

For example, the first communication processor 212 may transmit and receive data to and from the second communication processor 214 through an inter-processor interface 213. The inter-processor interface 213 may be configured as, but not limited to, a universal asynchronous receiver/transmitter (UART) (e.g., high speed-UART (HS-UART)) interface or a peripheral component interconnect bus express (PCIe) interface. Alternatively, the first communication processor 212 and the second communication processor 214 may exchange control information and packet data information by means of, for example, a shared memory. The first communication processor 212 may transmit and receive various pieces of information such as sensing information, information about output strength, and resource block (RB) allocation information to and from the second communication processor 214.

Depending on their implementation, the first communication processor 212 may not be coupled directly to the second communication processor 214. In this case, the first communication processor 212 may transmit and receive data to and from the second communication processor 214 through the processor 120 (e.g., an application processor). For example, the first communication processor 212 may transmit and receive data to and from the second communication processor 214 through the processor 120 (e.g., the application processor), an HS-UART interface or a PCIe interface, and a type of an interface is not limited. Alternatively, the first communication processor 212 may exchange control information and packet data information with the second communication processor 214 using the processor 120 (e.g., the application processor) and a shared memory.

Figure 2B:
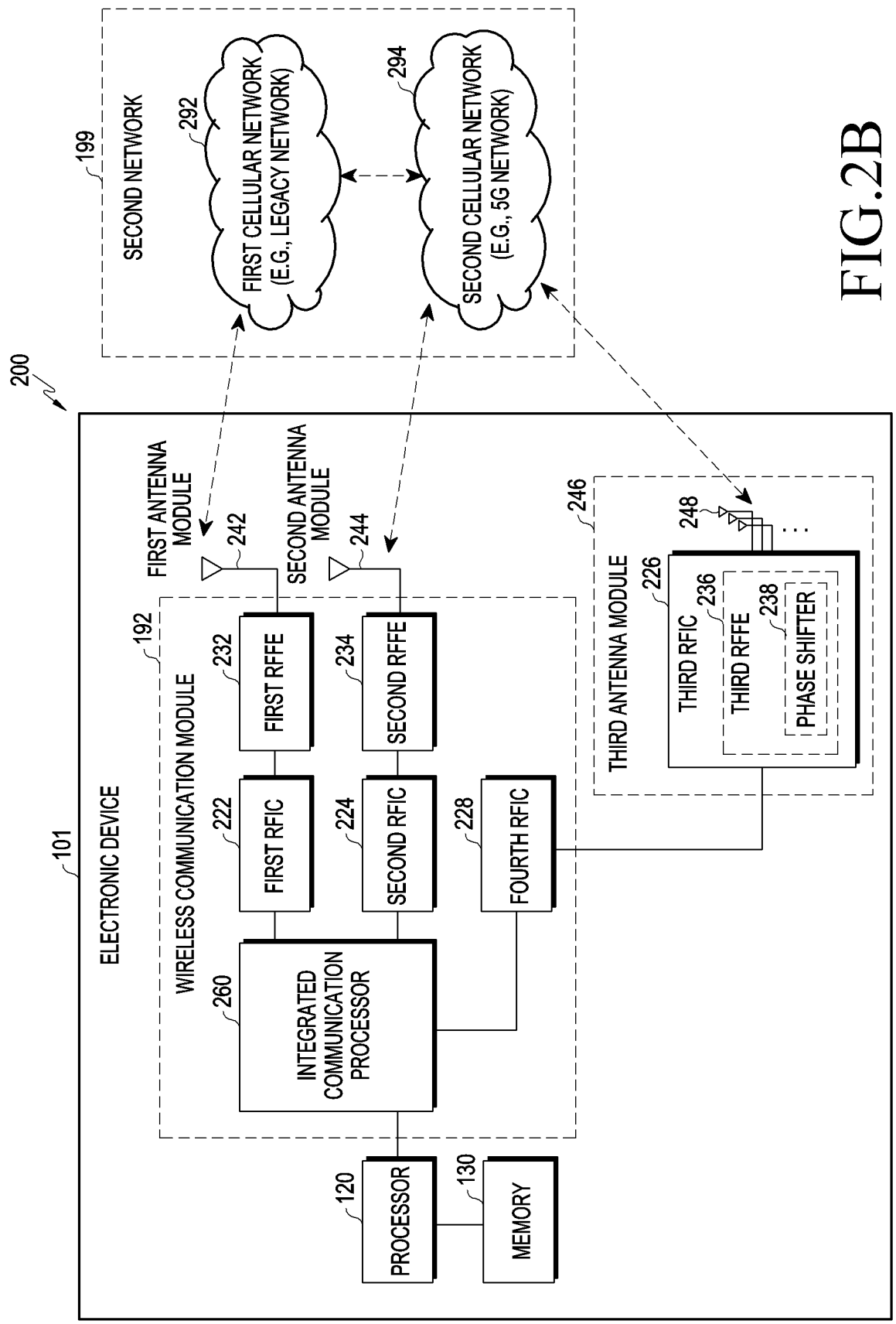
FIG. 2B is a block diagram of an electronic device for supporting a legacy network communication and a 5G network communication according to an embodiment of the disclosure.

FIG. 2B is a block diagram of an electronic device for supporting a legacy network communication and a 5G network communication according to an embodiment of the disclosure.

Referring to FIG. 2B, the first communication processor 212 and the second communication processor 214 may be incorporated in a single chip or a single package. According to various embodiments, the first communication processor 212 or the second communication processor 214 may be incorporated together with the processor 120, an auxiliary processor 123, or a communication module 190 in a single chip or a single package. For example, as illustrated in FIG. 2B, an integrated communication processor 260 may support all of functions for a communication with the first network 292 and the second network 294.

For transmission, the first RFIC 222 may convert a baseband signal generated by the first communication processor 212 to a radio frequency (RF signal in about 700 MHz to about 3 GHz used in the first network 292 (e.g., the legacy network). For reception, an RF signal may be obtained from the first network 292 (e.g., the legacy network) through an antenna (e.g., the first antenna module 242) and pre-processed through an RFFE (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to an RF signal in a Sub6 band (e.g., about 6 GHz or less) used in the second network 294 (e.g., the 5G network). For reception, a 5G Sub6 RF signal may be obtained from the second network 294 (e.g., the 5G network) through an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above6 RF signal) in a 5G Above6 band (e.g., about 6 GHz to about 60 GHz) to be used in the second network 294 (e.g., the 5G network). For reception, a 5G Above6 RF signal may be obtained from the second network 294 (e.g., the 5G network) through an antenna (e.g., the antenna 248) and pre-processed through the third RFFE 236. The third RFIC 226 may convert the pre-processed 5G Above6 RF signal to a baseband signal so that the baseband signal may be processed by the second communication processor 214. According to an embodiment, the third RFFE 236 may be formed as part of the third RFIC 226.

According to an embodiment, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHz) (hereinafter, referred to as an intermediate frequency (IF) signal), and provide the IF signal to the third RFIC 226. The third RFIC 226 may convert the IF signal to a 5G Above6 RF signal. During reception, a 5G Above6 RF signal may be received from the second network 294 (e.g., the 5G network) through an antenna (e.g., the antenna 248) and converted to an IF signal by the third RFIC 226. The fourth RFIC 228 may convert the IF signal to a baseband signal so that the baseband signal may be processed by the second communication processor 214.

According to an embodiment, the first RFIC 222 and the second RFIC 224 may be implemented as at least part of a single chip or a single package. According to an embodiment, the first RFFE 232 and the second RFFE 234 may be implemented as at least part of a single chip or a single package. According to an embodiment, at least one of the first antenna module 242 or the second antenna module 244 may be omitted or combined with the other antenna module to process RF signals in a plurality of corresponding bands.

According to an embodiment, the third RFIC 226 and the antenna 248 may be arranged on the same substrate to form a third antenna module 246. For example, the wireless communication module 192 or the processor 120 may be arranged on a first substrate (e.g., a main PCB). In this case, the third RFIC 226 may be arranged in a partial area (e.g., the bottom surface) of a second substrate (e.g., a sub PCB) other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of a transmission line between the third RFIC 226 and the antenna 248. This may reduce, for example, loss (e.g., attenuation) of a signal in a high frequency band (e.g., about 6 GHz to about 60 GHz) used for a 5G network communication, on the transmission line. Therefore, the electronic device 101 may increase quality or a speed of a communication with the second network 294 (e.g., the 5G network).

According to an embodiment, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the plurality of phase shifters 238 may change a phase of a 5G Above6 RF signal to be transmitted to the outside of the electronic device 101 (e.g., a base station in the 5G network) through a corresponding antenna element. During reception, each of the phase shifters 238 may change a phase of a 5G Above6 RF signal received from the outside through a corresponding antenna element to the same or substantially same phase. This enables transmission or reception through beamforming between the electronic device 101 and the outside.

The second network 294 (e.g., the 5G network) may be operated independently of the first network 292 (e.g., the legacy network) (e.g., SA (Stand-Alone)) or in connection to the first network 292 (e.g., the legacy network) (e.g., Non-Stand Alone (NSA)). For example, the 5G network may include only an access network (e.g., a 5G radio access network (RAN) or next generation RAN (NG RAN)) without a core network (e.g., a next generation core (NGC)). In this case, after accessing the access network of the 5G network, the electronic device 101 may access an external network (e.g., an Internet) under the control of a core network (e.g., an evolved packet core (EPC)) of the legacy network. Protocol information for a communication with the legacy network (e.g., LTE protocol information) and protocol information for a communication with the 5G network (e.g., New Radio (NR) protocol information) may be stored in the memory 130 and accessed by another component (e.g., the processor 120, the first communication processor 212, or the second communication processor 214).

Figure 3:
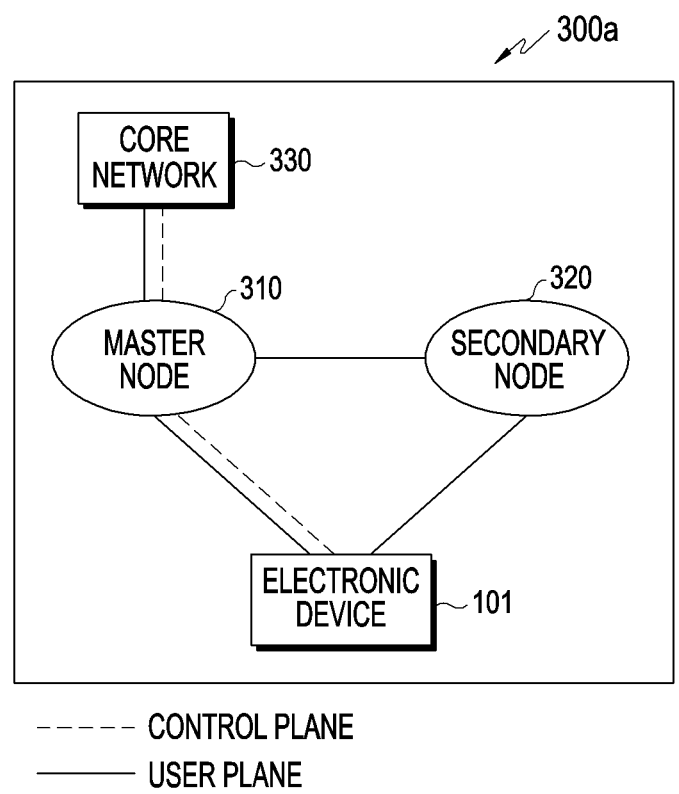
FIG. 3 is a diagram illustrating a wireless communication system which provides a legacy communication network and/or a 5G communication network according to an embodiment of the disclosure.

FIG. 3 is a diagram illustrating wireless communication system which provides a legacy communication network and/or a 5G communication network according to an embodiment of the disclosure.

Referring to FIG. 3, a network environment 300a may include at least one of a legacy network or a 5G network. The legacy network may include, for example, a 4G or LTE base station (e.g., an eNB or eNodeB) of the 3GPP standard supporting a wireless access of the electronic device 101, and an EPC which manages a 4G communication. The 5G network may include, for example, an NR base station (e.g., gNB or gNodeB) supporting a wireless access of the electronic device 101, and a 5th generation core (5GC) which manages a 5G communication of the electronic device 101.

According to various embodiments, the electronic device 101 may transmit and receive a control message and user data through a legacy communication and/or 5G communication. The control message may include a message related to at least one of, for example, security control, bearer setup, authentication, registration, or mobility management of the electronic device 101. The user data may refer to, for example, user data except for a control message transmitted and received between the electronic device 101 and a core network 330 (e.g., the EPC).

Referring again to FIG. 3, the electronic device 101 according to an embodiment may transmit and receive at least one of a control message or user data to and from at least part (e.g., an NR base station and a 5GC) of the 5G network using at least part (e.g., an LTE base station and an EPC) of the legacy network.

According to various embodiments, the network environment 300a may include a network environment which provides wireless communication dual connectivity (DC) to the LTE base station and the NR base station and transmits and receives a control message to and from the electronic device 101 through one core network 230 of the EPC or the 5GC.

According to various embodiments, in a DC environment, one of the LTE base station and the NR base station may operate as a master node (MN) 310 and the other may operate as a secondary node (SN) 320. The MN 310 may be connected to the core network 230 and transmit and receive a control message to and from the core network 230. The MN 310 and the SN 320 may be connected to each other through a network interface and transmit and receive a message related to management of a wireless resource (e.g., a communication channel) to and from each other.

According to various embodiments, the MN 310 may include the LTE base station, the SN 320 may include the NR base station, and the core network 330 may include the EPC. For example, a control message may be transmitted and received through the LTE base station and the EPC, and user data may be transmitted through at least one of the LTE base station or the NR base station.

According to various embodiments, the MN 310 may include the NR base station, the SN 320 may include the LTE base station, and the core network 330 may include the 5GC. For example, a control message may be transmitted and received through the NR base station and the 5GC, and user data may be transmitted through at least one of the LTE base station or the NR base station.

According to various embodiments, the electronic device 101 may be registered in at least one of the EPC or the 5GC, and transmit and receive a control message.

According to various embodiments, the EPC and the 5GC may interwork and manage a communication of the electronic device 101.

As described above, dual connectivity through an LTE base station and an NR base station may be referred to as E-UTRA new radio dual connectivity (EN-DC). Meanwhile, MR DC may be variously applied in addition to EN-DC. For example, a first network and a second network by the MR DC are all related to an LTE communication, and the second network may be a network which corresponds to a small-cell of a specific frequency. For example, the first network and the second network by the MR DC are all related to 5G, the first network may correspond to a frequency band below 6 GHz (e.g., below 6), and the second network may correspond to a frequency band of 6 GHz or above (e.g., over 6). In addition to the above-described examples, those skilled in the art will readily understand that a network structure may be applied to various embodiments of the disclosure as long as dual connectivity may be applied to the network structure.

Figure 4:
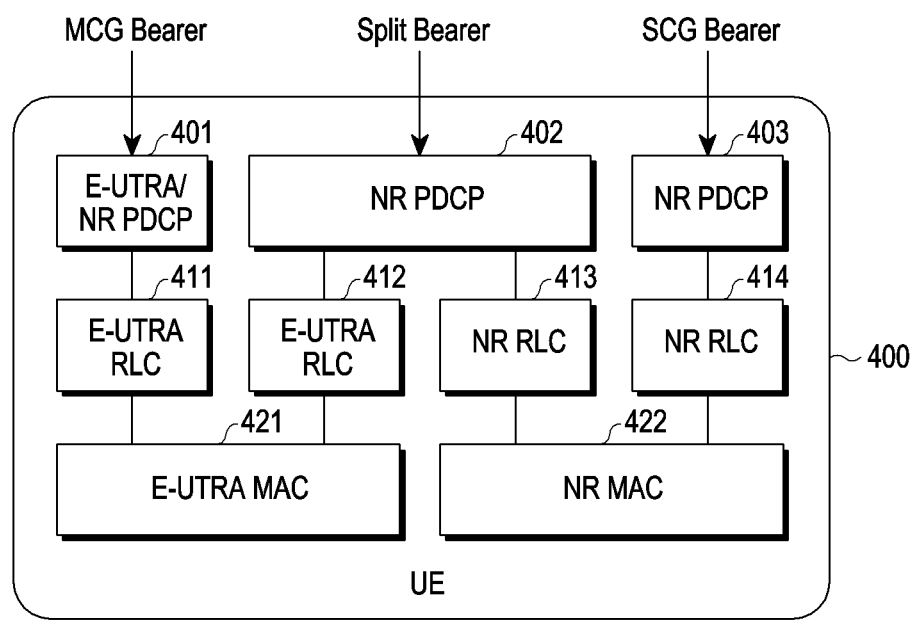
FIG. 4 illustrates a diagram for describing a bearer at a user equipment (UE) according to an embodiment of the disclosure.

FIG. 4 illustrates a diagram for describing a bearer at a UE according to an embodiment of the disclosure.

Referring to FIG. 4, bearers available in a 5G non-standalone network environment (e.g., a network environment 300a in FIG. 3) may include a master cell group (MCG) bearer, a secondary cell group (SCG) bearer, and a split bearer. An E-UTRA/NR packet data convergence protocol (PDCP) entity 401 and NR PDCP entities 402 and 403 may be configured to a user equipment (UE) 400 (e.g., an electronic device 101). An E-UTRA radio link control (RLC) entities 411 and 412 and NR RLC entities 413 and 414 may be configured to the UE 400. An E-UTRA MAC entity 421 and an NR MAC entity 422 may be configured to the UE 400. A UE may refer to a user device capable of communicating with a base station and may be interchangeably used with the electronic device 101 of FIG. 1. For example, in various embodiments of the disclosure, when it is said that the UE performs a specific operation, this may imply that at least one component included in the electronic device 101 performs the specific operation.

According to various embodiments, an MCG may correspond to, for example, an MN 310 in FIG. 3, and an SCG may correspond to, for example, an SN 320 in FIG. 3. Once a node to perform a communication is determined, the UE 400 may configure various entities illustrated in FIG. 4 to communicate with the determined node (e.g., a base station). The entities 401, 402 and 403 of a PDCP layer may receive data (e.g., a PDCP service data unit (SDU) corresponding to an IP packet) and output converted data (e.g., a PDCP protocol data unit (PDU)) in which additional information (e.g., header information) is reflected. The entities 411, 412, 413, and 414 of an RLC layer may receive the converted data (e.g., the PDCP PDU) output from the entities 401, 402 and 403 of the PDCP layer and output converted data (e.g., an RLC PDU) in which additional information (e.g., header information) is reflected. The entities 421 and 422 of a MAC layer may receive the converted data (e.g., the RLC PDU) output from the entities 411, 412, 413, and 414 of the RLC layer and output converted data (e.g., a MAC PDU) in which additional information (e.g., header information) is reflected to a physical layer (not shown).

According to various embodiments, in dual connectivity, an MCG bearer may be associated with a path (or data) in which data may be transmitted and received only using a resource or an entity which corresponds to an MN. In the dual connectivity, an SCG bearer may be associated with a path (or data) in which data may be transmitted and received only using a resource or an entity which corresponds to an SN. In the dual connectivity, a split bearer may be associated with a path (or data) in which data may be transmitted and received using the resource or the entity which corresponds to the MN or the resource or the entity which corresponds to the SN. Accordingly, as illustrated in FIG. 4, the split bearer may be associated with all of the E-UTRA RLC entity 412, the NR RLC entity 413, the E-UTRA MAC entity 421, and the NR MAC entity 422 through the NR PDCP entity 402.

Figure 5:
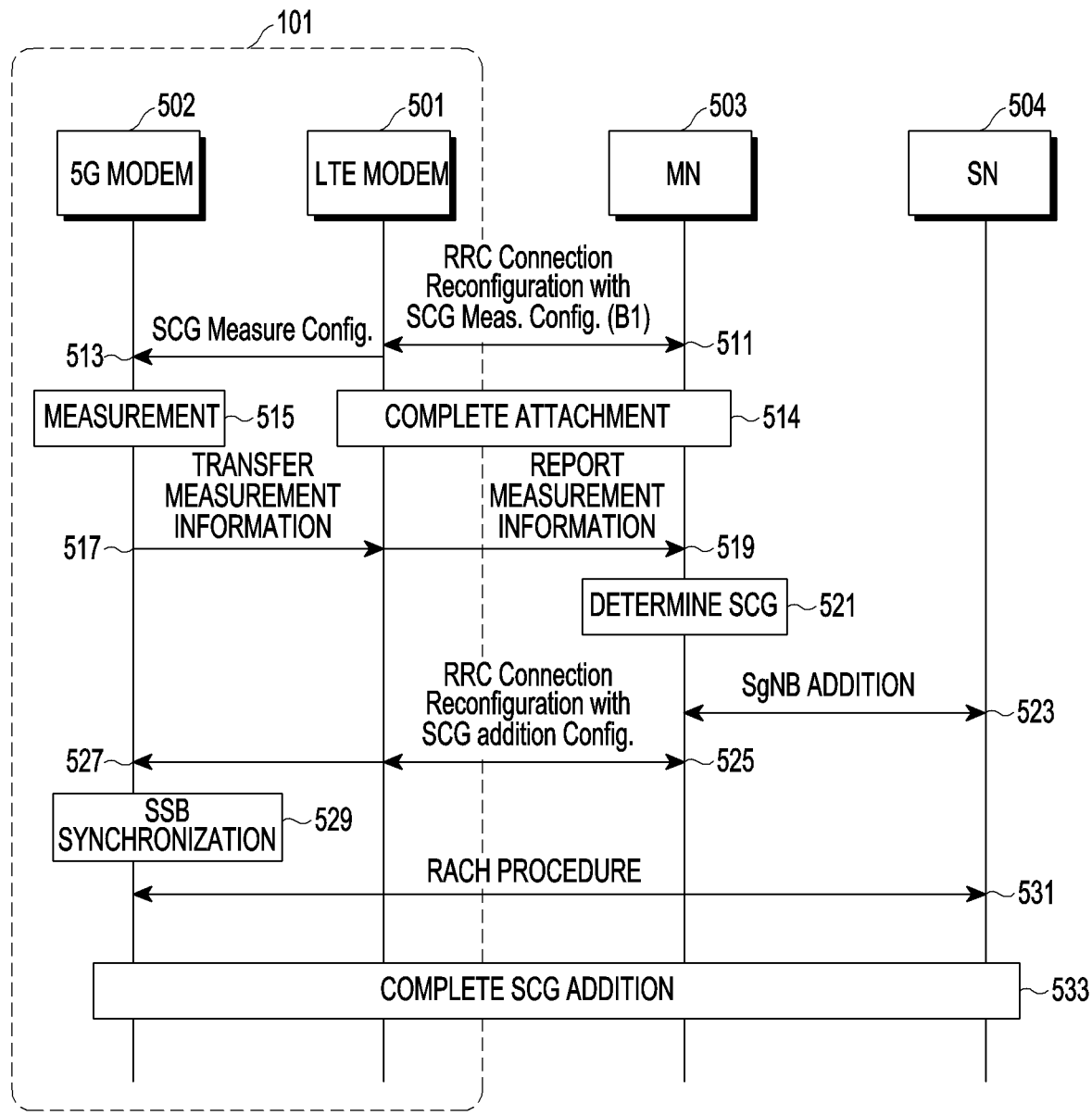
FIG. 5 illustrates a flowchart for describing a secondary cell group (SCG) addition process according to an embodiment of the disclosure.

FIG. 5 illustrates a flowchart for describing a SCG addition process according to an embodiment of the disclosure.

Referring to FIG. 5, an electronic device 101 according to various embodiments may include, for example, an LTE modem 501 and a 5G modem 502. For example, the electronic device 101 which uses EN-DC includes the LTE modem 501 and the 5G modem 502 in FIG. 5, however, the electronic device 101 according to various embodiments of the disclosure may use various types of MR DC described above, and the LTE modem 501 and the 5G modem 502 may be substituted with a modem (or a CP) which corresponds to a corresponding network according to a type of used MR DC. The LTE modem 501 may include, for example, a first communication processor 212 in FIG. 2A, and the 5G modem 502 may include, for example, a second communication processor 214 in FIG. 2A. In addition, although FIG. 5 illustrates a case in which a base station corresponding to LTE is determined as an MN and a base station corresponding to 5G is determined as an SN, the base station corresponding to the LTE may be determined as the SN and the base station corresponding to the 5G may be determined as the MN according to implementation. Meanwhile, in various embodiments, the electronic device 101 may include an integrated communication processor 260 as shown in FIG. 2B. In this case, it will be understood that at least part of operations of the LTE modem 501 and the 5G modem 502 is performed by the integrated communication processor 260. A description of the LTE modem 501 and the 5G modem 502 related to FIG. 5 described above may be equally applied to various embodiments of the disclosure as well as FIG. 5.

According to various embodiments, the electronic device 101 (e.g., the LTE modem 501) may perform RRC connection reconfiguration with an MN 503 (e.g., an MN 310) in operation 511. The LTE modem 501 may receive, for example, an RRC connection reconfiguration message from the MN 503, and a triggering event may be set to a B1 event in the RRC connection reconfiguration message. The B1 event may indicate an event in which an inter-RAT neighbor is better than a threshold value. An entering condition and a leaving condition according to the B1 event according to various embodiments may be as shown in Table 1.

TABLE 1

* LTE EventB1
Inequality B1-1 (Entering condition)
Mn + Ofn − Hys > Thresh
Inequality B1-2 (Leaving condition)
Mn + Ofn + Hys < Thresh
- Hys : hysteresis value
- Ofn : freq. specific offset Mn in Table 1 may indicate a measurement result for an inter-RAT neighbor cell, and may be a value for which any offset is not applied. In the disclosure, measurement for a neighbor cell may mean that a characteristic of a signal transmitted from the neighbor cell is measured. Mn may be expressed in dBm or dB depending on, for example, measurement quantity for the inter-RAT neighbor cell. Ofn may be a frequency-specific offset of a frequency of the inter-RAT neighbor cell. Hys may be a hysteresis parameter for the B1 event. Thresh may be a threshold value parameter for the B1 event. Ofn and Hys may be expressed in dB or dBm, and Hys may be expressed in the same unit as Mn. The electronic device 101 may transmit a measurement result for a corresponding cell to the MN 503 if Mn+Ofn−Hys is greater than Thresh, and perform at least one additional operation for MR DC. In addition, for example, if Mn+Ofn+Hys is less than Thresh, the electronic device 101 may stop transmitting the measurement result for the corresponding cell.

According to various embodiments, the LTE modem 501 may configure an SCG measurement report condition (e.g., the B1 event) (SCG measure Config.) in operation 513. In operation 514, the LTE modem 501 and the MN 503 may complete an attachment. According to various embodiments, in operation 515, the 5G modem 502 may identify measurement information (e.g., at least one of reference signal received power (RSRP), reference signal received quality (RSRQ), or a signal to interference plus noise ratio (SINR)) which corresponds to an inter-RAT cell (e.g., an SN 504). Upon identifying that a report condition (e.g., an entering condition of B1-1) is satisfied, the 5G modem 502 may transfer measurement information to the LTE modem 501 in operation 517. The LTE modem 501 may report the measurement information to the MN 503 in operation 519.

According to various embodiments, in operation 521, the MN 503 may determine an SCG based on the measurement information. For example, the MN 503 may select an SN 504. The MN 503 may perform an SgNB addition procedure in operation 523. For example, the MN 503 may request an SgNB addition from the SN 504 and receive an Ack corresponding thereto. In operation 525, the LTE modem 501 may perform an RRC connection reconfiguration with an SCG addition configuration (SCG addition Config.) with the MN 503. For example, the LTE modem 501 may receive, from the MN 503, an RRC connection reconfiguration with the SCG addition configuration. In operation 527, the LTE modem 501 may transfer configuration information to the 5G modem 502. In operation 529, the 5G modem 502 may perform synchronization signal block (SSB) synchronization. In operation 531, the 5G modem 502 may perform a RACH procedure. Various embodiments of the more detailed RACH procedure will be described with reference to FIG. 6. In operation 533, the 5G modem 502 may complete the SCG addition.

Figure 6:
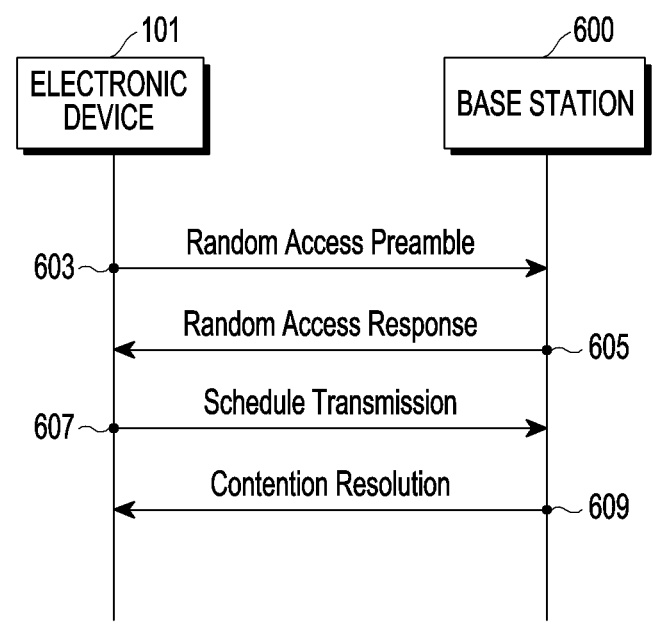
FIG. 6 illustrates a flowchart for describing a random access channel (RACH) procedure according to an embodiment of the disclosure.

FIG. 6 illustrates a flowchart for describing a RACH procedure according to an embodiment of the disclosure.

Referring to FIG. 6, an electronic device 101 (e.g., a 5G modem 502) may transmit a random access preamble to a base station 600 (e.g., an SN 504) in operation 603. In operation 605, the base station 600 may transmit a random access response to the electronic device 101. In operation 607, the electronic device 101 may perform a schedule transmission with the base station 600. The base station 600 may transmit contention resolution in operation 609.

In various embodiments, the electronic device 101 (e.g., the 5G modem 502) may identify a RACH failure. For example, the electronic device 101 may identify the RACH failure based on a failure in reception of the random access response or the contention resolution. The RACH failure, for example, may include a case that the maximum number of retransmissions for a message (e.g., a random access preamble) is reached (e.g., failureType-r15: randomAccessProblem (1)), and/or a case that a timer (e.g., a t304 timer) expires before RACH completion (e.g., failureType-r15: synchReconfigFailure-SCG (3)). A failure type may include, for example, one of t310-Expiry (0), randomAccessProblem (1), rlc-MaxNumRetx (2), scg-ChangeFailure (3), scg-reconfigFailure (4), and srb3-IntegrityFailure (5). Table 2 is an example of a message indicating an SCG failure according to various embodiments.

TABLE 2 failureReportSCG-NR-r15
    failureType-r15: synchReconfigFailureSCG (3)
        rsrpResult-r15: −98dBm <= SS-RSRP < −97dBm (59)
        rsrqResult-r15: 4.0dB <= SS-RSRQ < 4.5dB (95)
        rs-sinr-Result-r15: 11.5dB <= SS-SINR < 12.0dB (70)

As described above, the message indicating the SCG failure may include a failure type (e.g., synchReconfigFailureSCG (3)) and/or reported measurement information (e.g., RSRP, RSRQ, and an SINR). Upon receiving the corresponding message, the base station may transmit an RRC connection reconfiguration message for releasing SCG addition configuration to the electronic device 101.

Figure 7A:
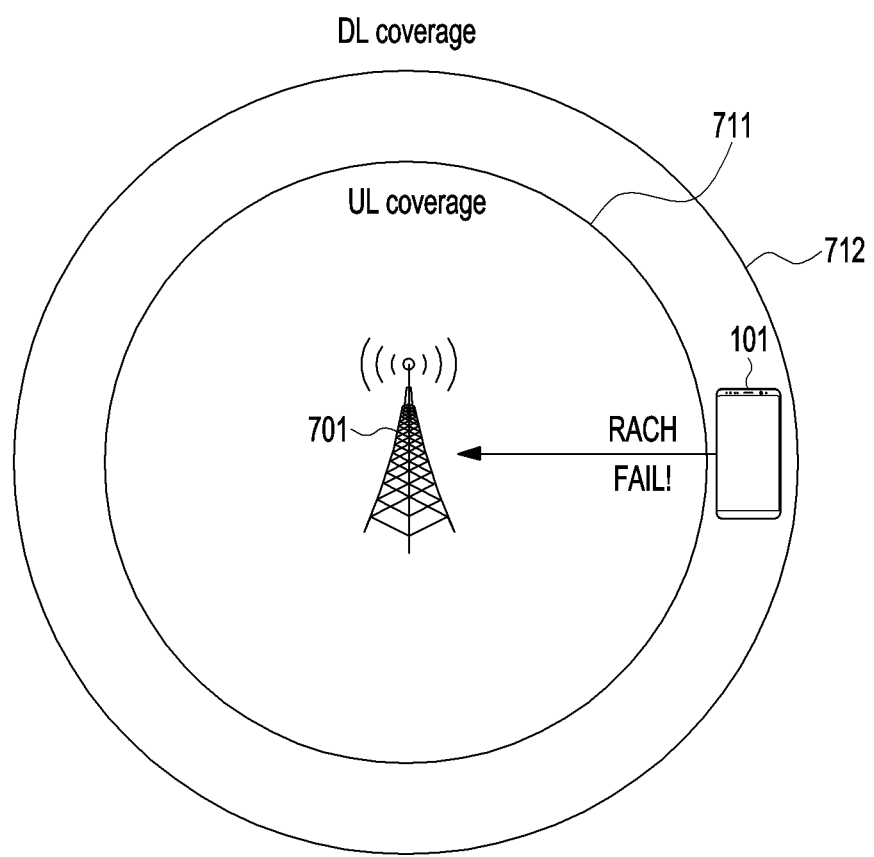
FIG. 7A illustrates a diagram for describing a situation in which a RACH failure occurs in an SCG addition process according to a comparative example for comparison with various embodiments according to an embodiment of the disclosure.

FIG. 7A illustrates a diagram for describing a situation in which a RACH failure occurs in an SCG addition process according to an embodiment of the disclosure.

Referring to FIG. 7A, an electronic device 101 may be located within a downlink (DL) coverage 712 of a base station 701 (e.g., a selected SN 504). The electronic device 101 may be located outside an uplink (UL) coverage 711 of the base station 701. As illustrated in FIG. 7A, the downlink coverage 712 may not match the uplink coverage 711. If the electronic device 101 is located within the downlink coverage 712 of the base station 701, measurement information including RSRP and/or RSRP of a communication signal from the base station 701 by the electronic device 101 (e.g., a 5G modem 502) may be greater than a threshold value. Here, a case that the measurement information is greater than the threshold value may mean that the measurement information is greater than the threshold value, or the measurement information to which an offset is applied is greater than the threshold value. The electronic device 101 may identify that the measurement information corresponding to the base station 701 satisfies a B1 event. The electronic device 101 may perform a RACH procedure for the base station 701 based on a fact that the satisfaction of the B1 event is identified. However, because the electronic device 101 is located outside the uplink coverage 711 of the base station 701, the electronic device 101 may detect a RACH failure. Thereafter, there is a possibility that the electronic device 101 performs a measurement information report procedure and the RACH procedure for the base station 701 again.

Figure 7B:
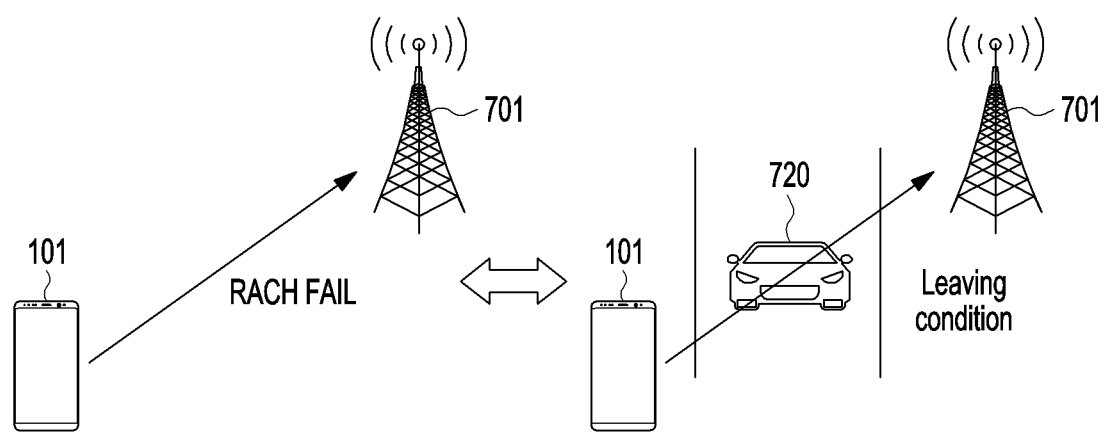
FIG. 7B illustrates a diagram for describing a situation in which a RACH failure occurs in an SCG addition process according to a comparative example for comparison with various embodiments according to an embodiment of the disclosure.

FIG. 7B illustrates a diagram for describing a situation in which a RACH failure occurs in an SCG addition process according to an embodiment of the disclosure.

Referring FIG. 7B, an electronic device 101 may perform a RACH procedure with a base station 701, but may detect a RACH failure. Thereafter, an object 720 may be located at a line of sight (LOS) between the electronic device 101 and the base station 701. In this case, strength of a communication signal from the base station 701 measured by the electronic device 101 may decrease sharply. The electronic device 101 may identify that a leaving condition of a B1 event is satisfied based on a sharp decrease in the strength of the communication signal. Thereafter, there is a possibility that the electronic device 101 performs a measurement information report procedure and the RACH procedure for the base station 701 again.

As described with reference to FIGS. 7A and 7B, there is a possibility that an electronic device 101 according to a comparative example for comparison with various embodiments performs a RACH procedure again for a base station where the RACH procedure fails. The electronic device 101 may detect repetitive satisfaction for an entering condition and a leaving condition of a B1 event, and may be also referred to as ping-pong phenomenon. As the ping-pong phenomenon is repeated, the electronic device 101 repeatedly performs a measurement information report procedure and the RACH procedure for a base station 701 having a low probability of RACH success, thereby increasing resource waste and battery consumption. For example, battery consumption may occur because TP is degraded due to bearer change and activation/deactivation of a 5G modem 502 is repeatedly performed. In particular, the electronic device 101 may perform message transmission in a relatively large size during the RACH procedure, so a battery consumption problem may be further exacerbated. The ping-pong phenomenon described above is likely to occur in a weak electric field range (for example, a range in which RSRP is close to a threshold value). However, even in a strong electric field range (for example, a range in which the RSRP is greater than the threshold value), the ping-pong phenomenon may occur due to a low SINR due to inter-cell interference.

Figure 8:
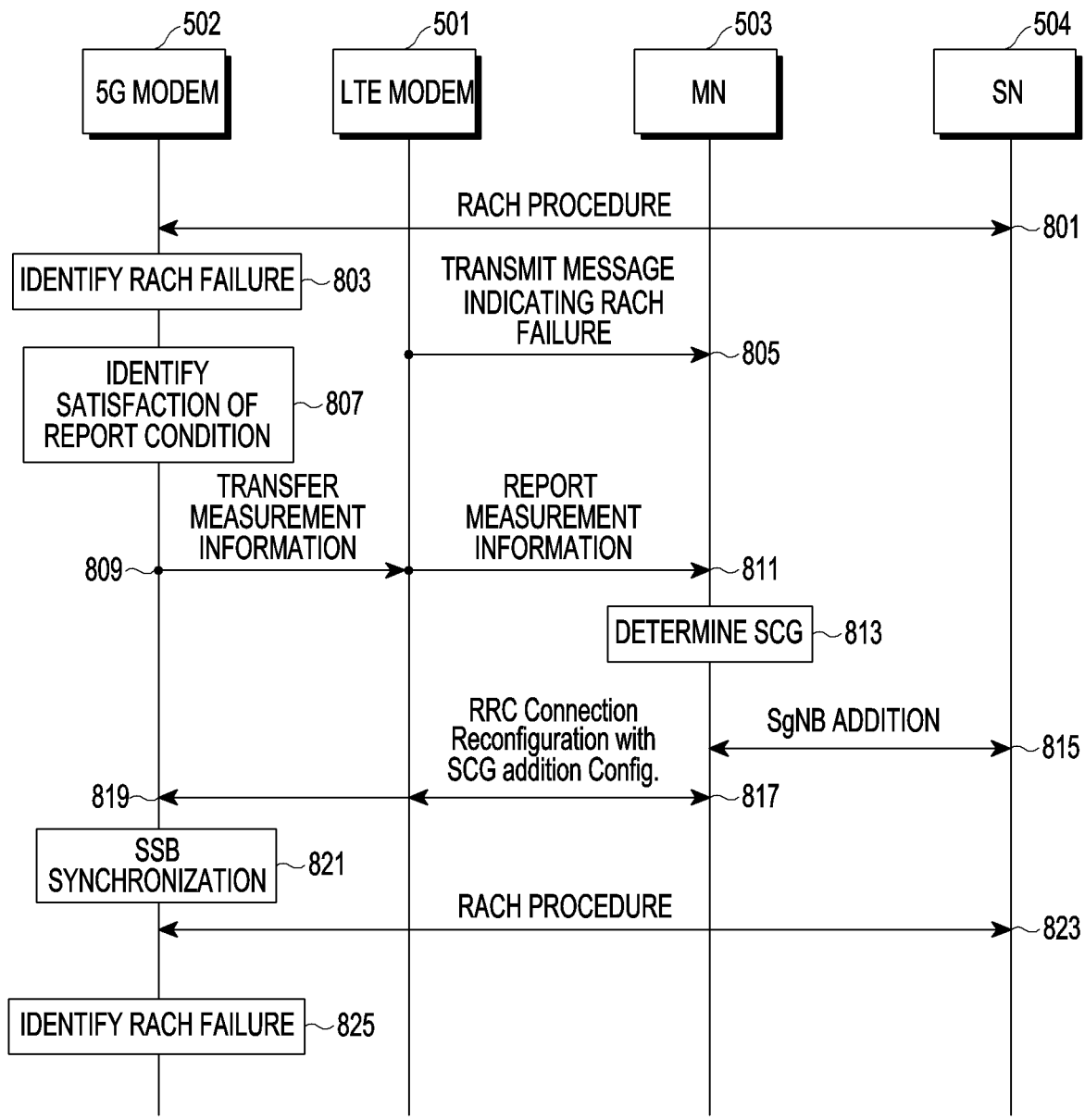
FIG. 8 illustrates a flowchart for describing repetition of a RACH failure in an electronic device according to a comparative example for comparison with various embodiments according to an embodiment of the disclosure.

FIG. 8 illustrates a flowchart for describing repetition of a RACH failure in an electronic device according to a comparative example for comparison with various embodiments according to an embodiment of the disclosure.

Referring to FIG. 8, for example, it is assumed that an electronic device 101 has already performed operations preceding a RACH procedure of operation 531 in FIG. 5. According to various embodiments, after performing SSB synchronization, a 5G modem 502 may perform a RACH procedure with an SN 504 selected by an MN 503 in operation 801. The 5G modem 502 may identify a RACH failure in operation 803. In operation 805, an LTE modem 501 may transmit a message indicating the RACH failure to the MN 503. For example, a threshold value (Thresh) of a B1 event may be set to −100 dBm. In this case, only a measurement result of −100 dBm or more may be reported to the MN 503. An event identifier (eventide) corresponding to detection of the B1 event may be eventB1-NR-r15. For example, if the measurement information is −100 dBm or more, the electronic device 101 may report the measurement information to the MN 503, and then perform a RACH procedure (e.g., operation 801). If the RACH failure is detected, for example, the LTE modem 501 may transmit SCG failure information to the MN 503. As described above, the SCG failure information may include a failure cause, for example, synchReconfigFailureSCG (1) or synchReconfigFailureSCG (3). In addition, the electronic device 101 may report measurement information. For example, RACH failure information may include an RSRP value, an RSRQ value, and/or an SINR value. After the RACH failure, the 5G modem 502 may identify whether an existing report condition is satisfied again. For example, the 5G modem 502 may identify whether measurement information is greater than a threshold value identified through an existing RRC connection reconfiguration message.

According to various embodiments, the 5G modem 502 may identify satisfaction of the report condition based on measurement in operation 807. As described above, the 5G modem 502 may identify that measurement information corresponding to the SN 504 is greater than the previously identified threshold value (Thresh) of the B1 event. Based on a fact that the satisfaction of the report condition is identified, the 5G modem 502 may transfer the measurement information to the LTE modem 501 in operation 809. The LTE modem 501 may report the measurement information to the MN 503 in operation 811. In operation 813, the MN 503 may determine an SCG. For example, the MN 503 may select the SN 504. In operation 815, the MN 503 may perform an SgNB addition procedure with the SN 504. In operation 817, the MN 503 may perform, with the LTE modem 501, RRC connection reconfiguration, for example, RRC connection reconfiguration with SCG addition configuration (SCG addition Config.). For example, the MN 503 may transfer an RRC connection reconfiguration message with SCG addition configuration to the LTE modem 501. The LTE modem 501 may transfer configuration information (e.g., SCG addition configuration) to the 5G modem 502 in operation 819. The 5G modem 502 may perform SSB synchronization in operation 821. The 5G modem 502 may perform a RACH procedure with the SN 504 in operation 823. In operation 825, the 5G modem 502 may identify a RACH failure again. For example, if the 5G modem 502 maintains a report condition (e.g., a report condition indicating whether measurement information is greater than a threshold value which corresponds to a B1 event) previously obtained from a network, RACH procedures (e.g., operation 801 and operation 823) are repeatedly performed, and resources and power may be wasted.

Figure 9A:
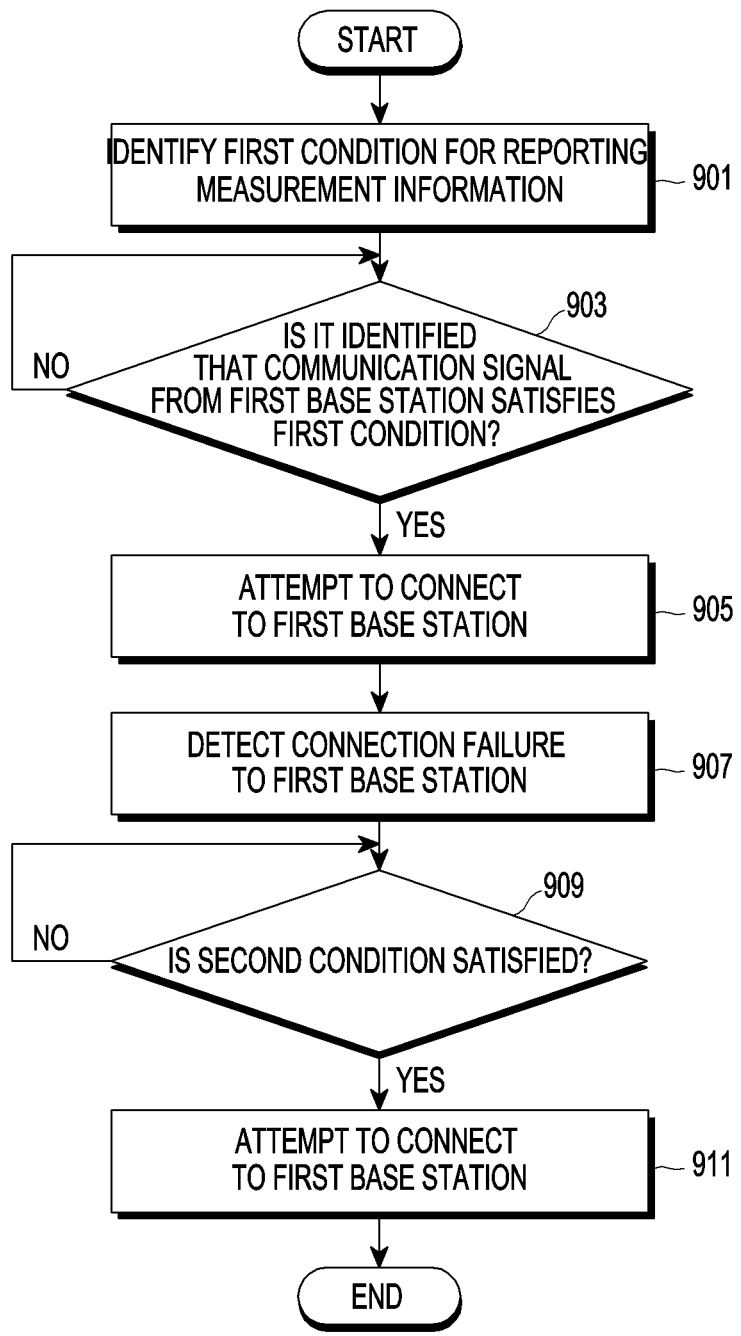
FIGS. 9A and 9B illustrate flowcharts for describing an operating method of an electronic device according to various embodiments of the disclosure.

FIG. 9A illustrates a flowchart for describing an operating method of an electronic device according to an embodiment of the disclosure.

Referring to FIG. 9A, it will be described with reference to FIG. 10.

Figure 10:
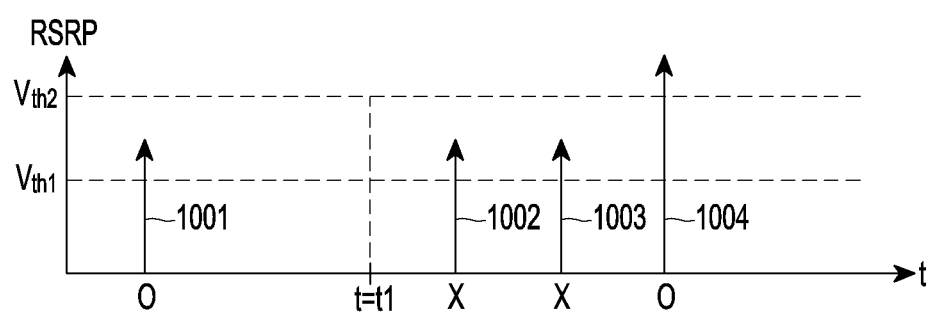
FIG. 10 illustrates RSRP measured by an electronic device according to an embodiment of the disclosure.

FIG. 10 illustrates RSRP measured by an electronic device according to an embodiment of the disclosure.

Referring to FIG. 10, an electronic device 101 (e.g., at least one communication processor 212, 214, and/or 260) according to various embodiments may identify a first condition for reporting measurement information in operation 901. For example, the electronic device 101 may receive an RRC connection reconfiguration message including a B1 event from an MN 503. The electronic device 101 may identify the first condition indicating whether measurement information corresponding to a neighbor cell is greater than a threshold value set in the B1 event.

According to various embodiments, the electronic device 101, in operation 903, may identify whether a communication signal from a first base station satisfies the first condition in. For example, the electronic device 101 may identify whether measurement information (e.g., RSRP, RSRQ, and/or an SINR) which is based on the communication signal from the first base station (e.g., an SN 504) is greater than the threshold value set in the B1 event. If it is identified that the first condition is not satisfied (903—NO), the electronic device 101 may continuously identify whether the measurement information satisfies the first condition. If it is identified that the first condition is satisfied (903—YES), the electronic device 101 may attempt to connect to the first base station in operation 905. As described above with reference to FIG. 4, the electronic device 101 may transmit measurement information to the MN 503, receive an RRC connection reconfiguration message with SCG addition configuration from the MN 503, and then attempt to connect to the first base station. In operation 907, the electronic device 101 may detect a connection failure to the first base station. For example, referring to FIG. 10, the electronic device 101 may identify a first threshold value $V_{th1}$ which corresponds to the first condition from a network (e.g., the MN 503). Based on RSRP 1001 of the communication signal from the first base station being greater than the first threshold value $V_{th1}$, the electronic device 101 may attempt to connect to the first base station. At a first time point t1, the electronic device 101 may identify the connection failure to the first base station.

According to various embodiments, in operation 909, the electronic device 101 may identify whether a second condition for reporting the measurement information corresponding to the first base station is satisfied. For example, the second condition may be a condition indicating whether measurement information corresponding to a neighbor cell (e.g., the first base station) where a RACH procedure fails is greater than another threshold value different from the threshold value identified from the network. The other threshold value may be larger than the threshold value identified from the network, and a method of setting the other threshold value according to various embodiments will be described with reference to FIGS. 11A and 11B. For example, referring to FIG. 10, the electronic device 101 may set a second threshold value $V_{th2}$ which is the other threshold value. The electronic device 101 may store the second threshold value $V_{th2}$ in a memory 130. The second threshold value $V_{th2}$ may be set by the electronic device 101 or may be obtained from the network depending on implementation. For example, the electronic device 101 may receive the second threshold value $V_{th2}$ as a separate value when receiving information about the first threshold value $V_{th1}$. Alternatively, the electronic device 101 may receive an RRC connection reconfiguration message including information about the second threshold value $V_{th2}$ from the MN 503 after a RACH failure.

In various embodiments, the electronic device 101 may apply the existing first condition to a neighbor cell which has no history that a RACH procedure fails, and may apply the second condition to a neighbor cell which has a history that the RACH procedure fails.

According to various embodiments, if the second condition is not satisfied (909—NO), the electronic device 101 may continuously perform the measurement for the neighbor cell. If it is identified that the second condition is satisfied (909—YES), the electronic device 101 may attempt to connect to the first base station in operation 911. In various embodiments of the disclosure, a case that the electronic device 101 attempts to connect to the first base station may include a procedure in which the electronic device 101 reports, to the MN 503, measurement information which corresponds to the first base station, and those skilled in the art will readily understand this. For example, referring to FIG. 10, based on a fact that RSRP 1002 and 1003 corresponding to the first base station are less than or equal to the second threshold value $V_{th2}$, the electronic device 101 may not report the measurement information for the first base station. Based on a fact that RSRP 1004 corresponding to the first base station is greater than the second threshold value $V_{th2}$, the electronic device 101 may report the measurement information for the first base station to the MN 503.

Figure 9B:
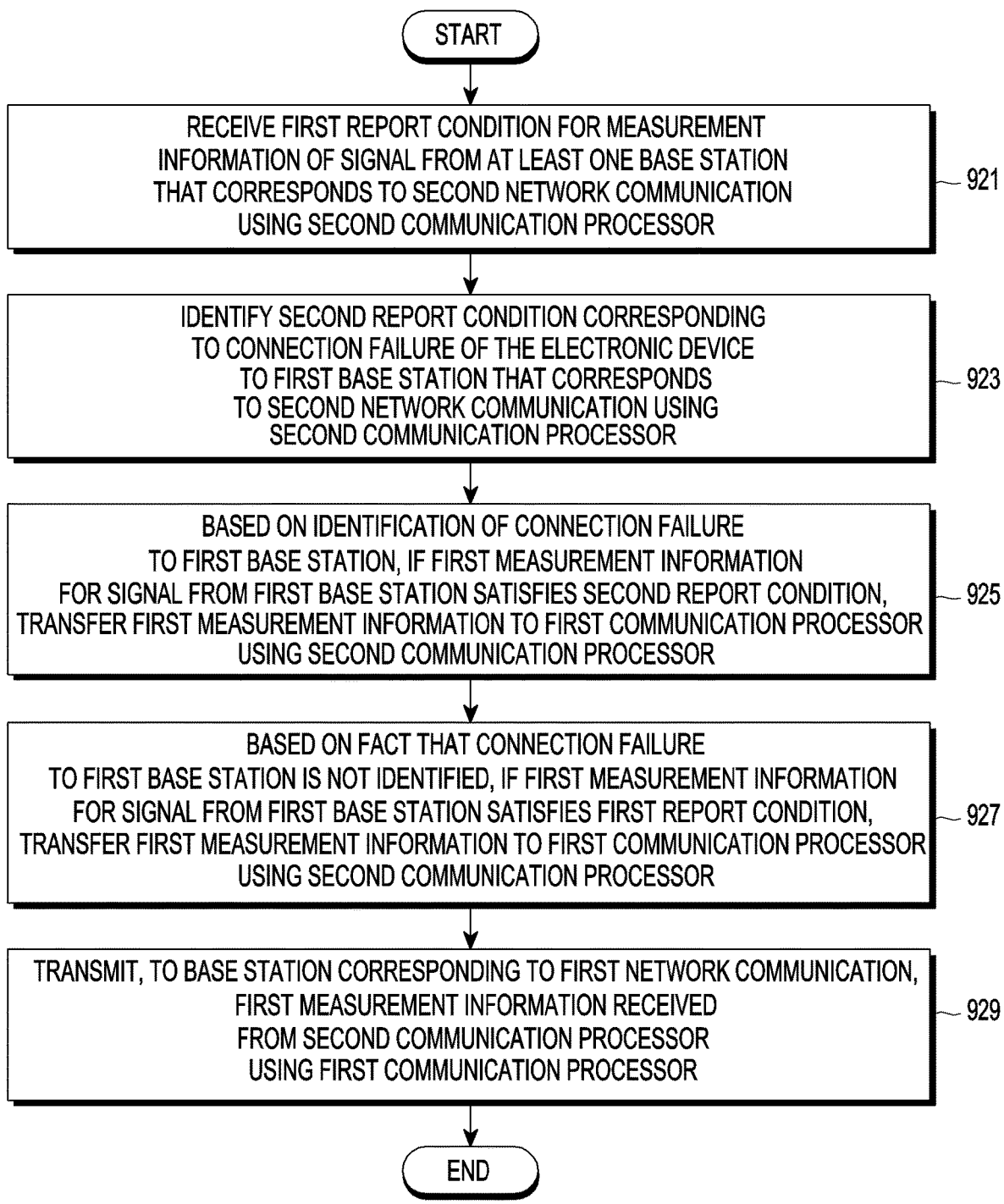

FIG. 9B illustrates a flowchart for describing an operating method of an electronic device according to an embodiment of the disclosure.

Referring to FIG. 9B, in operation 921, an electronic device 101 may receive a first report condition for measurement information of a signal from at least one base station which corresponds to a second network communication (e.g., an NR communication) using a second communication processor (e.g., a 5G modem 502). In operation 923, the electronic device 101 may identify a second report condition corresponding to a connection failure to a first base station which corresponds to the second network communication (e.g., the NR communication) using the second communication processor (e.g., the 5G modem 502). Based on the identification of the connection failure to the first base station, if first measurement information for a signal from the first base station satisfies the second report condition, the electronic device 101 may transfer the first measurement information to a first communication processor (e.g., an LTE modem 501) using the second communication processor (e.g., the 5G modem 502) in operation 925. Based on a fact that the connection failure to the first base station is not identified, if the first measurement information for the signal from the first base station satisfies the first report condition, the electronic device 101 may transfer the first measurement information to the first communication processor (e.g., the LTE modem 501) using the second communication processor (e.g., the 5G modem 502) in operation 927. In operation 929, the electronic device 101 may transmit, to a base station which corresponds to a first network communication, the first measurement information received from the second communication processor (e.g., the 5G modem 502) using the first communication processor (e.g., the LTE modem 501).

Figure 11A:
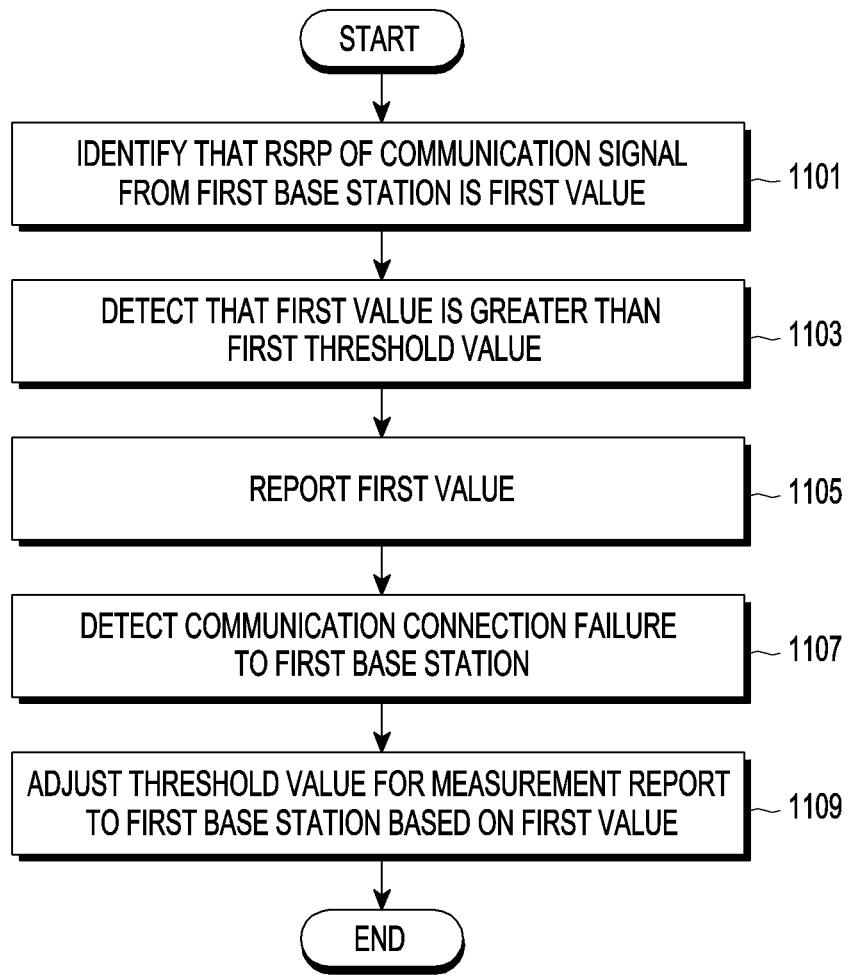
FIG. 11A illustrates a flowchart for describing an operating method of an electronic device according to an embodiment of the disclosure.

FIG. 11A illustrates a flowchart for describing an operating method of an electronic device according to an embodiment of the disclosure.

Referring to FIG. 11A, an electronic device 101 (e.g., at least one communication processor 212, 214, and/or 260) may identify that RSRP of a communication signal from a first base station is a first value in operation 1101. In operation 1103, the electronic device 101 may detect that the first value is greater than a first threshold value. Here, the first threshold value may be, for example, a value obtained from a network. Based on the first value being greater than the first threshold value, the electronic device 101 may report the first value to an MN 503 in operation 1105. In operation 1107, the electronic device 101 may detect a communication connection failure to the first base station. Although not shown, the electronic device 101 may receive an RRC connection reconfiguration message with SCG addition configuration from the MN 503 after reporting the first value, perform a RACH procedure, and detect a communication connection failure while performing the above-described operation.

According to various embodiments, in operation 1109, the electronic device 101 may adjust a threshold value for a measurement report to the first base station based on the first value. In one embodiment, the electronic device 101 may set the first value as a new threshold value. For example, the electronic device 101 may identify that the first threshold value obtained from the network is −100 dBm, and the first value which is a measured value is −98 dBm. Upon identifying that the communication connection to the first base station fails after reporting the value of −98 dBm to the MN 503, the electronic device 101 may set the threshold value which corresponds to the first base station to the measured value, −98 dBm. The electronic device 101 may store measurement information (e.g., an rsrpResult-r15 value) included in a RACH failure message (e.g., a failureReportSCG-NR-r15 message) and use it as the threshold value. In another embodiment, the electronic device 101 may set a second value which uses the first value as a new threshold value. For example, the electronic device 101 may identify the second value by performing a specified calculation on the first value, and may use it as the new threshold value. As will be described later, the electronic device 101 may release a communication connection after establishing the communication connection with a base station. The electronic device 101 may calculate a second value from a first value based on whether the number of times a ping-pong phenomenon occurs increases, a cause of the communication connection release, and/or time taken to release the communication connection. Alternatively, the electronic device 101 may identify the second value by a scheme in which an offset value corresponding to a channel situation is applied to the first value (e.g., reduction of 1 dB). Alternatively, the electronic device 101 may identify the second value by a scheme in which a specified offset value is simply applied to the first value (e.g., reduction of 1 dB).

Figure 11B:
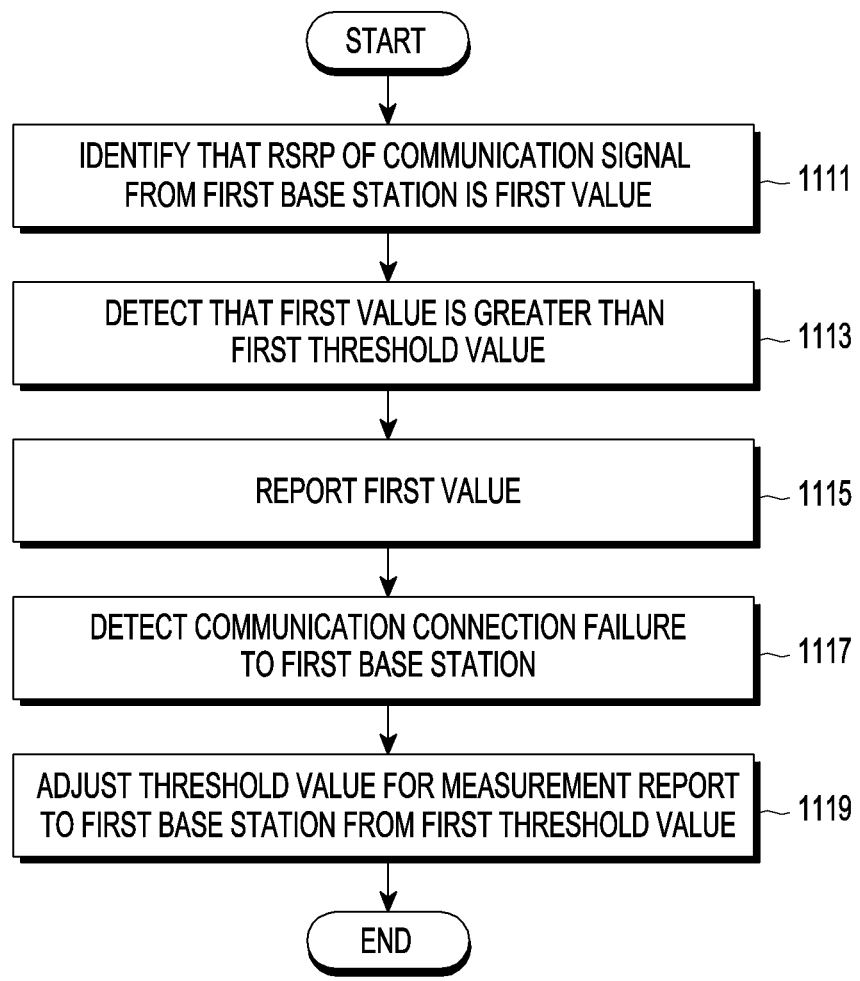
FIG. 11B illustrates a flowchart for describing an operating method of an electronic device according to an embodiment of the disclosure.

FIG. 11B illustrates a flowchart for describing an operating method of an electronic device according to an embodiment of the disclosure.

Referring to FIG. 11B, a description of operations 1111, 1113, 1115, and 1117 may be the same or similar to operations 1101, 1103, 1105, and 1107 in FIG. 11A, so a description thereof will be omitted herein.

According to various embodiments, an electronic device 101 (e.g., at least one communication processor 212, 214, and/or 260) may adjust a threshold value for a measurement report to a first base station from a first threshold value in operation 1119. For example, the electronic device 101 may identify a second threshold value by performing a specified calculation on the first threshold value. As will be described later, the electronic device 101 may establish a communication connection with a base station, and then the communication connection may be released. The electronic device 101 may calculate the second threshold value from the first threshold value based on whether the number of times a ping-pong phenomenon occurs increases, a cause of the communication connection release, and/or time taken to release the communication connection. Meanwhile, if a failure is additionally detected, the electronic device 101 may identify a third threshold value as a result of the calculation which is based on the second threshold value, and use this as a new threshold value.

Figure 12:
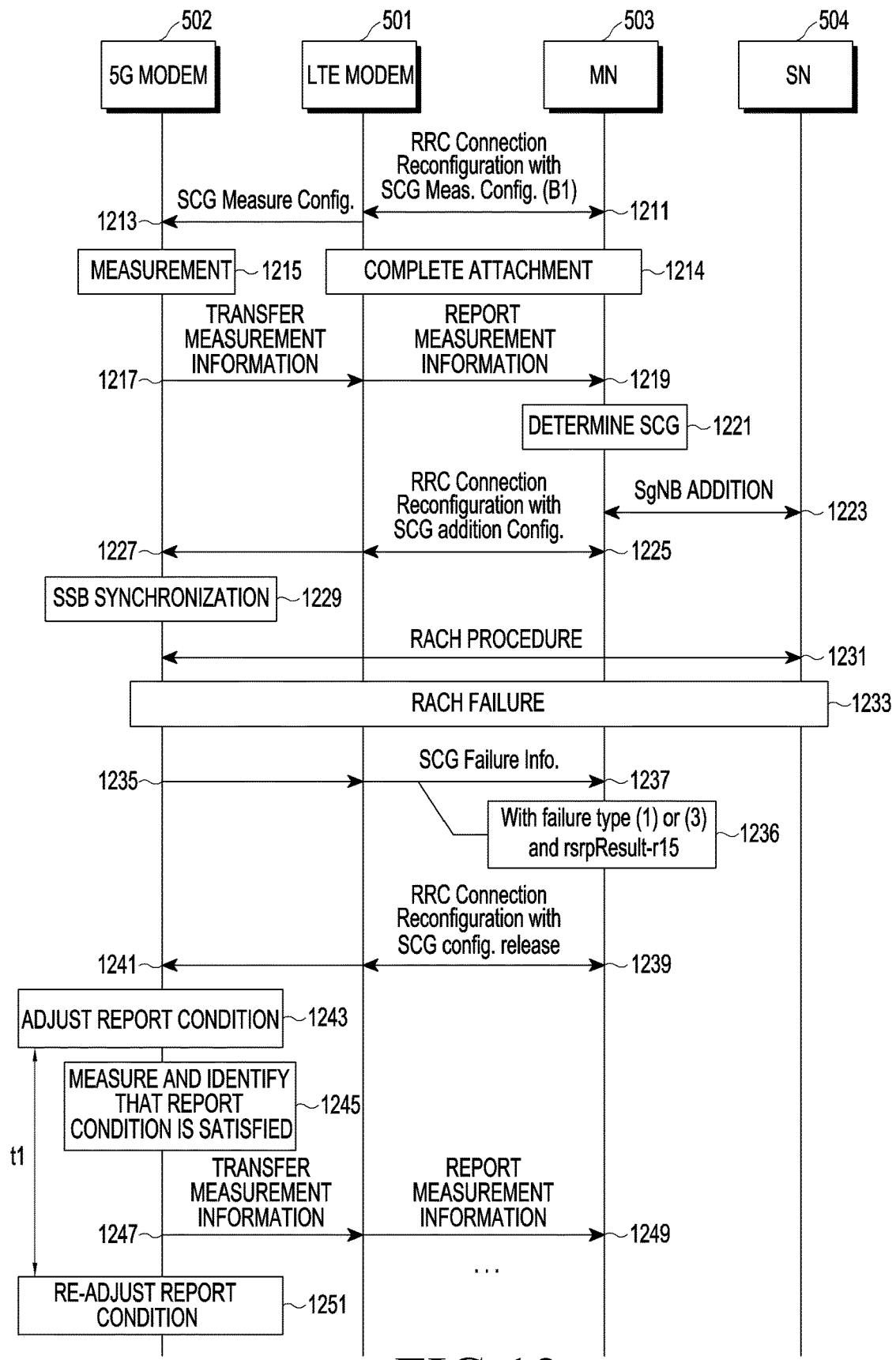
FIG. 12 illustrates a flowchart for describing adjustment of a report condition in a case of a RACH failure according to an embodiment of the disclosure.

FIG. 12 illustrates a flowchart for describing adjustment of a report condition in a case of a RACH failure according to an embodiment of the disclosure.

Referring to FIG. 12 in operation 1211, an LTE modem 501 may perform, with an MN 503, RRC connection reconfiguration with SCG measurement configuration (SCG measure Config.) (e.g., a B1 event). For example, the LTE modem 501 may receive an RRC connection reconfiguration message including the B1 event from the MN 503. In operation 1213, the LTE modem 501 may transfer SCG measurement configuration information to a 5G modem 502. In operation 1214, the LTE modem 501 and the MN 503 may complete an attachment. In operation 1215, the 5G modem 502 may perform measurement on a neighbor cell. If it is identified that measurement information for the neighbor cell satisfies the B1 event in the RRC connection reconfiguration, the 5G modem 502 may transfer the measurement information to the LTE modem 501 in operation 1217. The LTE modem 501 may report the measurement information to the MN 503 in operation 1219. In operation 1211, the MN 503 may determine an SCG (e.g., an SN 504) based on the received measurement information in operation 1221. The MN 503 and the SN 504 may perform a procedure for SgNB addition in operation 1223. In operation 1225, the MN 503 may perform, with the LTE modem 501, RRC connection reconfiguration with SCG (e.g., the SN 504) addition configuration (SCG addition Config.). For example, the MN 503 may transmit an RRC connection reconfiguration message with SCG addition configuration to the LTE modem 501. The LTE modem 501 may transfer SCG addition configuration information to the 5G modem 502 in operation 1227. In operation 1229, the 5G modem 502 may perform SSB synchronization. In operation 1231, the 5G modem 502 may perform a RACH procedure with the SN 504. In operation 1233, the electronic device 101 may identify a RACH failure.

According to various embodiments, the 5G modem 502 may transfer SCG failure information (SCG failure Info.) to the LTE modem 501 in operation 1235. The LTE modem 501 may report the SCG failure information to the MN 503 in operation 1237. For example, the LTE modem 501 may report, to the MN 503, a message 1236 including a failure type (e.g., synchReconfigFailureSCG (1) or synchReconfigFailureSCG (3)) and measurement information (e.g., an RSRP measurement result (rsrpResult-r15)). The MN 503 may perform RRC connection reconfiguration with SCG configuration release (SCG Config. release) in operation 1239. In operation 1241, the LTE modem 501 may transfer SCG configuration release information to the 5G modem 502.

According to various embodiments, in operation 1243, the 5G modem 502 may adjust a report condition. For example, the 5G modem 502 may adjust the report condition by setting the measurement information included in the message 1236 as a threshold value. Alternatively, the 5G modem 502 may adjust the report condition by setting the highest measurement information among the measurement information included in the message 1236 or reported measurement information which is previously stored as the threshold value. Alternatively, the 5G modem 502 may further adjust the threshold value by performing a specified calculation on the threshold value set as described above. In operation 1245, the 5G modem 502 may perform measurement on a neighbor cell. The 5G modem 502 may apply the adjusted report condition to a neighbor cell (e.g., the SN 504) where the RACH failure occurs. Upon identifying that measurement information corresponding to the SN 504 satisfies the adjusted report condition, the 5G modem 502 may transfer the measurement information to the LTE modem 501 in operation 1247. In operation 1249, the LTE modem 501 may report the measurement information to the MN 503. Meanwhile, if a specified period t1 elapses, the 5G modem 502 may re-adjust the adjusted report condition in operation 1251. For example, the 5G modem 502 may return to a report condition which corresponds to a threshold value identified from a network if the specified period elapses.

Figure 13:
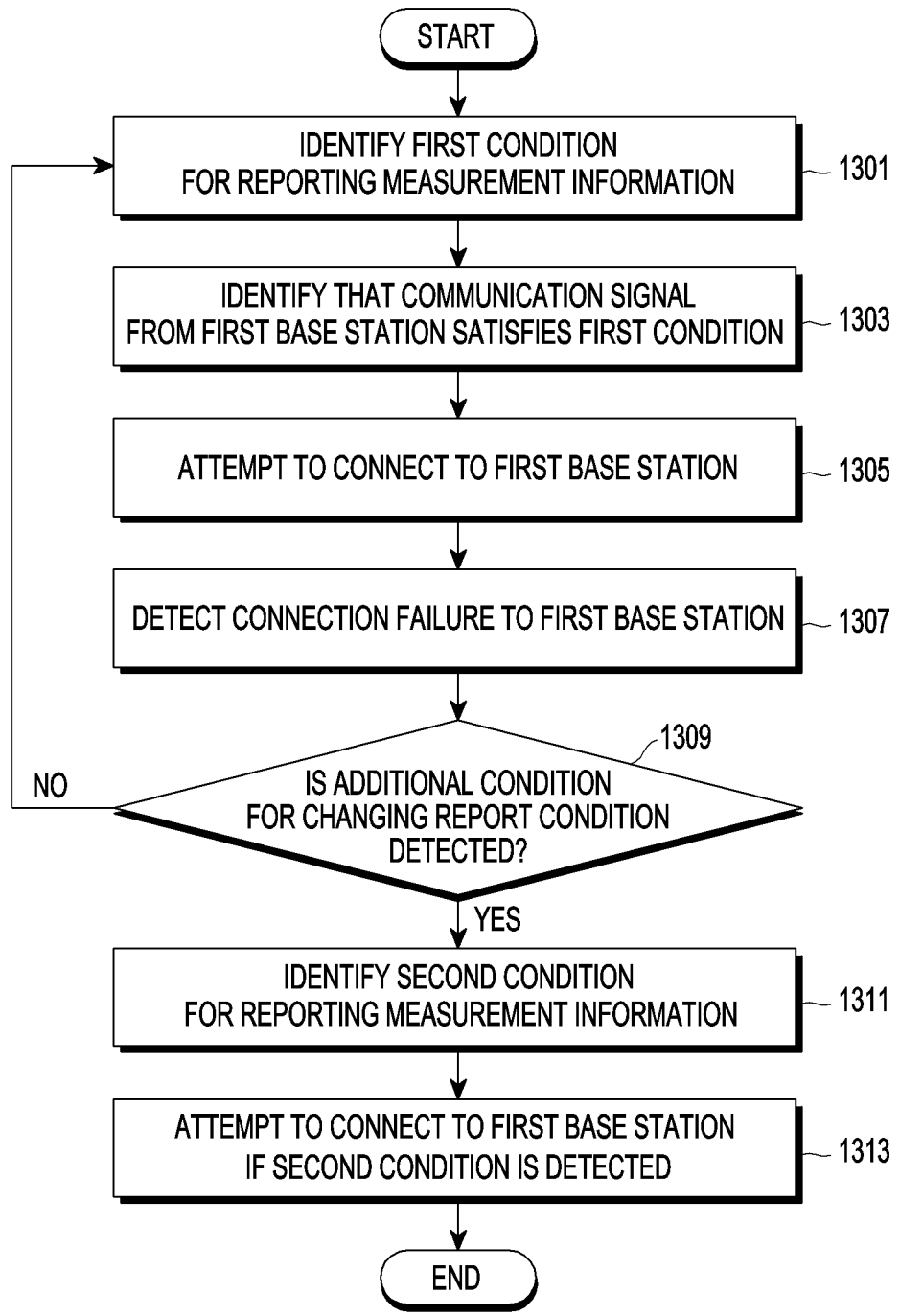
FIG. 13 illustrates a flowchart for describing an operating method of an electronic device according to an embodiment of the disclosure.

FIG. 13 illustrates a flowchart for describing an operating method of an electronic device according to an embodiment of the disclosure.

Referring to FIG. 13, an electronic device 101 (e.g., at least one communication processor 212, 214, and/or 260) may identify a first condition for reporting measurement information in operation 1301. In operation 1303, the electronic device 101 may identify that a communication signal from a first base station satisfies the first condition. In operation 1305, the electronic device 101 may attempt to connect to the first base station. In operation 1307, the electronic device 101 may detect a connection failure to the first base station.

According to various embodiments, in operation 1309, the electronic device 101 may identify whether an additional condition for changing a report condition is detected. For example, the electronic device 101 may identify an additional condition related to the number of connection failures to a corresponding cell, a time duration which elapses after a connection failure to the corresponding cell is detected, and/or reported measurement information when the connection failure to the corresponding cell occurs. For example, the electronic device 101 may apply a second condition to the first base station if it is identified that the additional condition is satisfied, rather than immediately applying the second condition based on the connection failure to the first base station. If it is not identified that the additional condition is detected (1309—NO), the electronic device 101 may maintain the application of the first condition for the first base station. If it is identified that the additional condition is detected (1309—YES), the electronic device 101 may identify a second condition for reporting measurement information in operation 1311. As described above, the second condition may include a threshold value different from a threshold value set in the first condition. In operation 1313, if the second condition is detected, the electronic device 101 may attempt to connect to the first base station.

Figure 14:
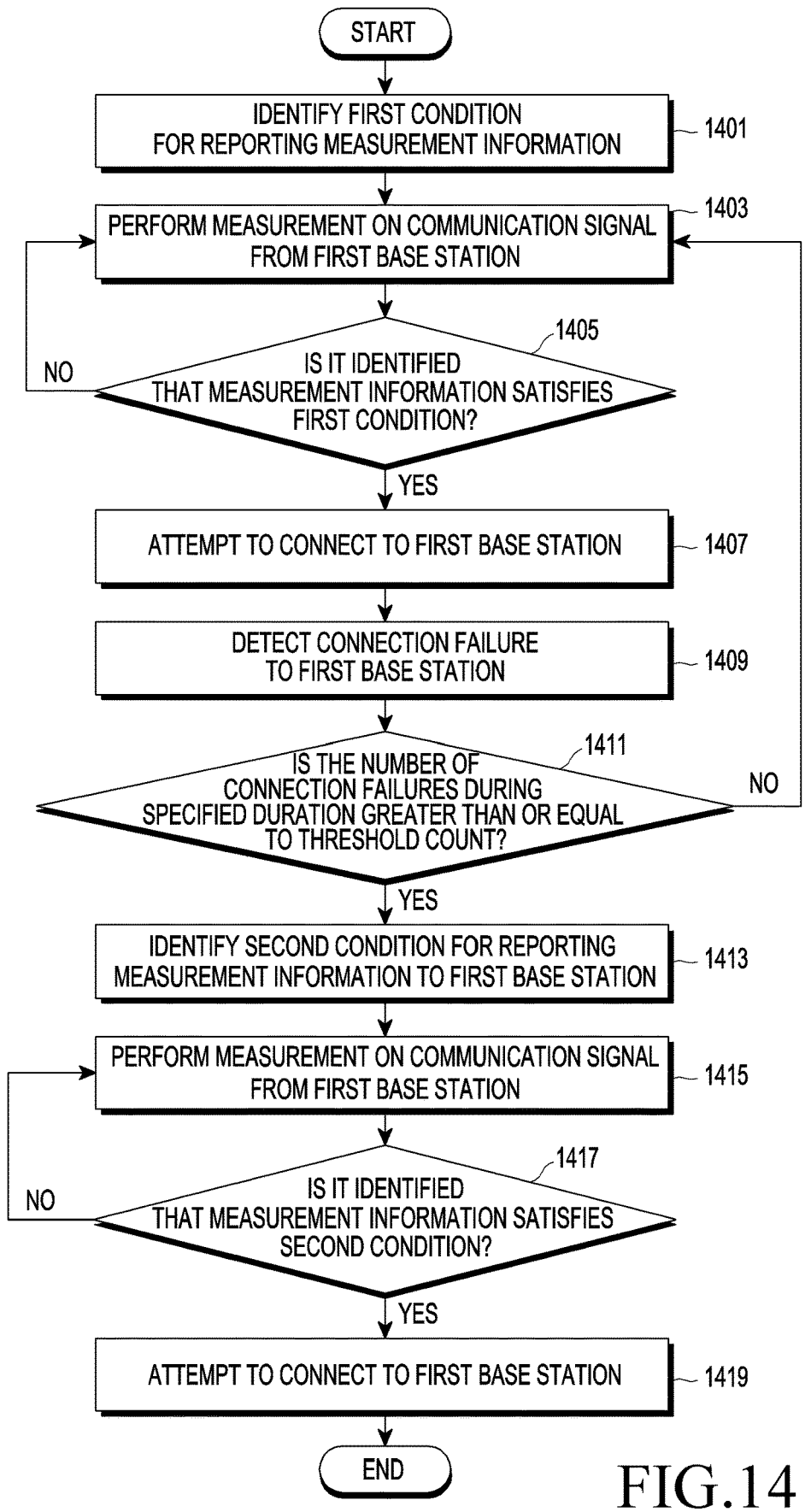
FIG. 14 illustrates a flowchart for describing an operating method of an electronic device according to an embodiment of the disclosure.

FIG. 14 illustrates a flowchart for describing an operating method of an electronic device according to an embodiment of the disclosure.

Referring to FIG. 14, an electronic device 101 (e.g., at least one communication processor 212, 214, and/or 260) may identify a first condition for reporting measurement information in operation 1401. In operation 1403, the electronic device 101 may perform measurement on a communication signal from a first base station. In operation 1405, the electronic device 101 may identify whether measurement information satisfies the first condition. If it is identified that the first condition is not satisfied (1405—NO), the electronic device 101 may repeat the performance of the measurement and the identification of whether the first condition is satisfied. If it is identified that the first condition is satisfied (1405—YES), the electronic device 101 may attempt to connect to the first base station in operation 1407. In operation 1409, the electronic device 101 may detect a connection failure to the first base station.

According to various embodiments, in operation 1411, the electronic device 101 may identify whether the number of connection failures during a specified duration is greater than or equal to a threshold count. The electronic device 101 may record (or store) a history of a connection failure, and identify whether the number of cumulative connection failures including the connection failure identified in operation 1409 is greater than or equal to the threshold count. The number of connection failures may be counted, for example, during the specified duration, but is not limited thereto. If it is identified that the number of connection failures is less than the threshold count (1411—NO), the electronic device 101 may repeat the performance of measurement for the first base station and the identification of whether the first condition is satisfied. If it is identified that the number of connection failures is greater than or equal to the threshold count (1411—YES), the electronic device 101 may identify a second condition for reporting measurement information to the first base station in operation 1413. In operation 1415, the electronic device 101 may perform measurement on a communication signal from the first base station. In operation 1417, the electronic device 101 may identify whether a measurement result satisfies the second condition. If it is identified that the second condition is not satisfied (1417—NO), the electronic device 101 may repeat the performance of the measurement for the first base station and the identification of whether the second condition is satisfied. If it is identified that the second condition is satisfied (1417—YES), the electronic device 101 may attempt to connect to the first base station in operation 1419. As described above, a report condition is not adjusted immediately after one connection failure occurs, so it is possible to prevent that a communication connection possibility is degraded due to a temporary deterioration in a channel situation.

Figure 15:
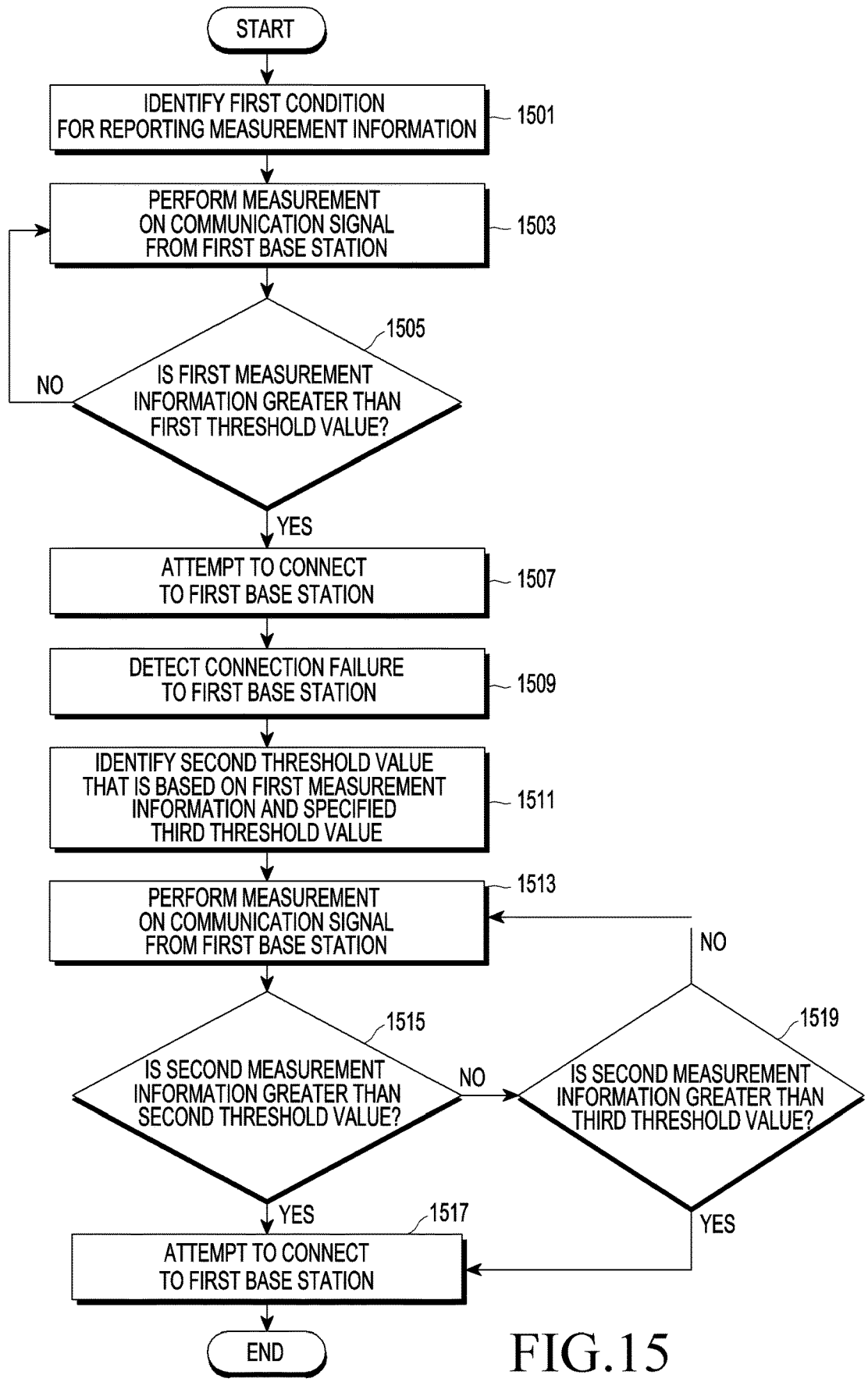
FIG. 15 illustrates a flowchart for describing an operating method of an electronic device according to an embodiment of the disclosure.

FIG. 15 illustrates a flowchart for describing an operating method of an electronic device according to an embodiment of the disclosure.

Referring to FIG. 15, it will be described with reference to FIG. 16.

Figure 16:
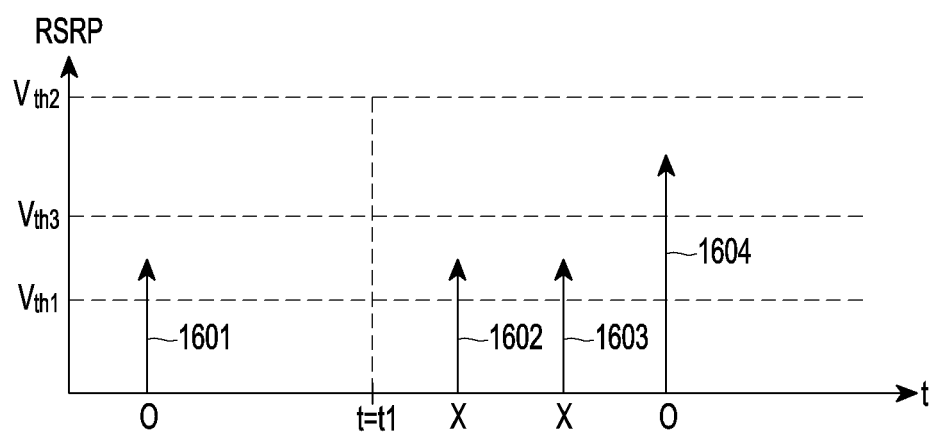
FIG. 16 illustrates RSRP measured by an electronic device according to an embodiment of the disclosure.

FIG. 16 illustrates RSRP measured by an electronic device according to an embodiment of the disclosure.

Referring to FIG. 16, an electronic device 101 (e.g., at least one communication processor 212, 214, and/or 260) may identify a first condition for reporting measurement information in operation 1501. The first condition may be, for example, a condition indicating whether the measurement information is greater than a first threshold value. In operation 1503, the electronic device 101 may perform measurement on a communication signal from a first base station. In operation 1505, the electronic device 101 may identify whether first measurement information is greater than the first threshold value. If it is identified that the first measurement information is less than or equal to the first threshold value (1505—NO), the electronic device 101 may repeat the performance of the measurement for the first base station and the identification of whether the first measurement information is greater than the first threshold value. If it is identified that the first measurement information is greater than the first threshold value (1505—YES), the electronic device 101 may attempt to connect to the first base station. In operation 1507, the electronic device 101 may attempt to connect to the first base station. In operation 1509, the electronic device 101 may detect a connection failure to the first base station. For example, in FIG. 16, based on RSRP 1601 being greater than or equal to a first threshold value $V_{th1}$, the electronic device 101 may attempt to connect to the first base station, and then may identify the connection failure to the first base station at a time point t1.

According to various embodiments, in operation 1511, the electronic device 101 may identify a second threshold value which is based on the first measurement information and a specified third threshold value. The electronic device 101 may identify the second threshold value based on report information which is reported on a connection failure, or may identify the second threshold value based on the first threshold value. The electronic device 101 may identify the third threshold value which is a specified value. The third threshold value may be, for example, a value indicating that channel status is good, may be stored in advance, and may be adjusted later in some cases. For example, the third threshold value may indicate an intermediate value, a minimum value, or an average value in a range indicating a good value within a range of values defined to indicate signal strength, but is not limited thereto. A good range may be set by a designer based on an experimental result, and may be, for example, a range in which a probability of communication failure is greater than or equal to a specific threshold value. Alternatively, the good range may be defined by a relevant standard, but there is no limitation thereto. As the third threshold value is a fixed value, the second threshold value may be greater than, equal to, or less than the third threshold value. In operation 1513, the electronic device 101 may perform measurement on a communication signal from the first base station. In operation 1515, the electronic device 101 may identify whether second measurement information is greater than the second threshold value. If it is identified that the second measurement information is greater than the second threshold value (1515—YES), the electronic device 101 may attempt to connect to the first base station in operation 1517. If it is identified that the second measurement information is less than or equal to the second threshold value (1515—NO), the electronic device 101 may identify whether the second measurement information is greater than the third threshold value in operation 1519. If it is identified that the second measurement information is less than or equal to the third threshold value (1519—NO), the electronic device 101 may repeat the measurement for the first base station and the identification of whether the second measurement information is greater than the second threshold value. If it is identified that the second measurement information is greater than the third threshold value (1519—YES), the electronic device 101 may attempt to connect to the first base station. For example, referring to FIG. 16, after identifying the connection failure to the first base station at the time point t1, the electronic device 101 may identify the second threshold value $V_{th2}$ and the third threshold value $V_{th3}$. In an example of FIG. 16, the third threshold value $V_{th3}$ may be less than the second threshold value $V_{th2}$. For example, even though a channel between the electronic device 101 and the SN 504 is in a good state, the third threshold value $V_{th3}$ may be less than the second threshold value $V_{th2}$ in a situation in which a RACH failure temporarily occurs. The electronic device 101 may identify the RACH failure after reporting RSRP of a relatively large value, and set the second threshold value $V_{th2}$ based on the measured RSRP of the relatively large value. Thereafter, if the measured RSRP is not greater than the relatively large second threshold value, there is a possibility that the electronic device 101 suspends a measurement condition report even though channel status is good. The electronic device 101 may be configured to set the third threshold value $V_{th3}$ indicating that the channel is in a good state, and to report a measurement condition if the measured RSRP is greater than the third threshold value $V_{th3}$. For example, for RSRPs 1602 and 1603 which are less than or equal to the first threshold value $V_{th1}$ in FIG. 16, the electronic device 101 may suspend report. However, the electronic device 101 may report RSRP 1604 which is less than or equal to the second threshold value $V_{th2}$ and greater than the third threshold value $V_{th3}$. Accordingly, it is possible to prevent communication delay if a RACH failure temporarily occurs even though channel status is generally good.

Although not shown, the electronic device 101 according to various embodiments may be configured to apply a changed condition to the first base station if a time point when the connection failure is identified is within a preset duration from a time point when a previous connection failure is identified. The electronic device 101 may store information about a connection failure, and determine whether to apply the changed condition based on stored data. Also, the electronic device 101 may determine whether to apply the changed condition using a combination including at least one of the additional conditions described above.

Figure 17:
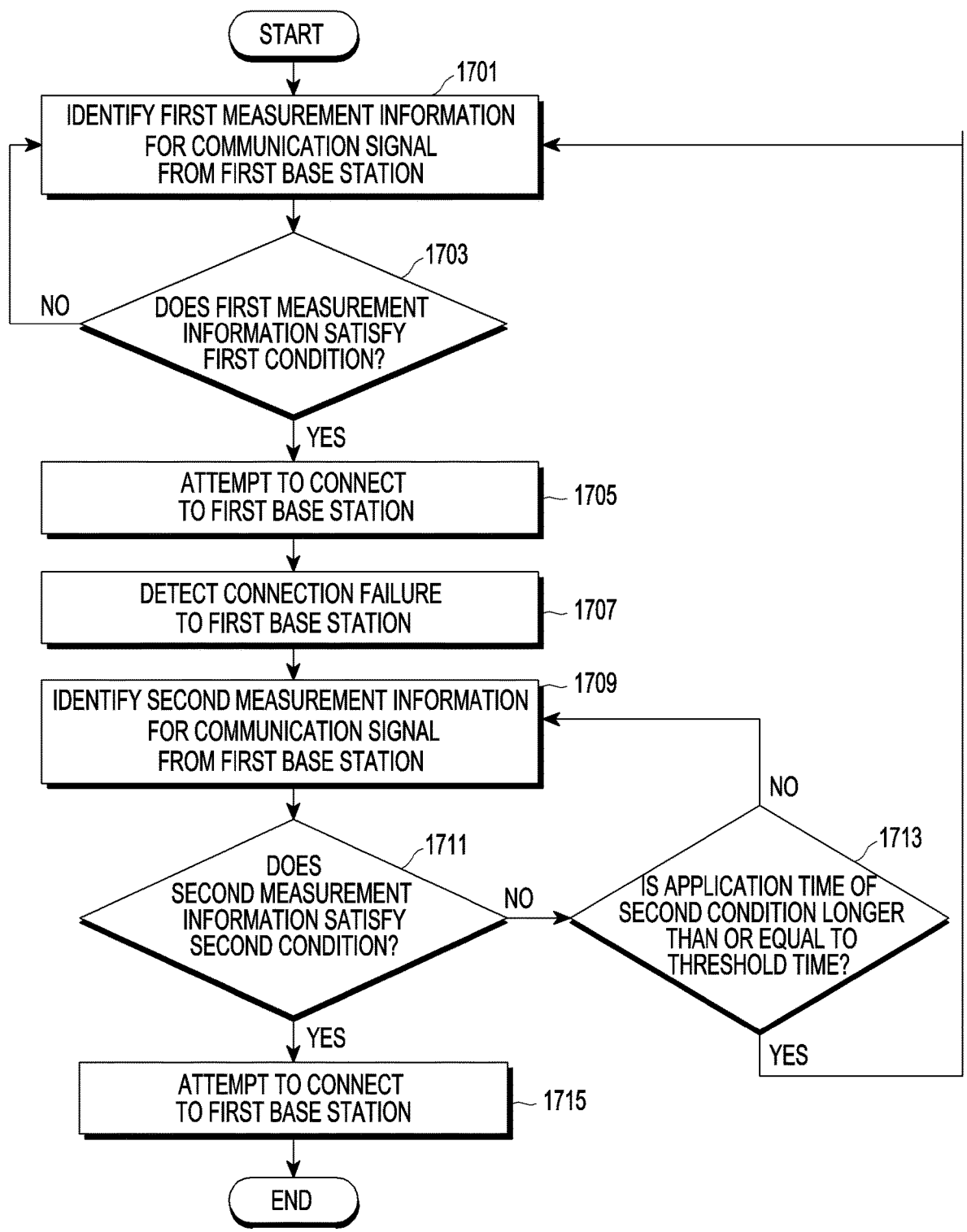
FIG. 17 illustrates a flowchart for describing an operating method of an electronic device according to an embodiment of the disclosure.

FIG. 17 illustrates a flowchart for describing an operating method of an electronic device according to an embodiment of the disclosure.

Referring to FIG. 17, an electronic device 101 (e.g., at least one communication processor 212, 214, and/or 260) may identify first measurement information for a communication signal from a first base station in operation 1701. In operation 1703, the electronic device 101 may identify whether the first measurement information satisfies a first condition. If it is identified that the first condition is not satisfied (1703—NO), the electronic device 101 may repeat measurement for the first base station and the identification of whether the first condition is satisfied. If it is identified that the first condition is satisfied (1703—YES), the electronic device 101 may attempt to connect to the first base station in operation 1705. In operation 1707, the electronic device 101 may detect a connection failure to the first base station. After detecting the connection failure to the first base station, the electronic device 101 may identify second measurement information for the communication signal from the first base station in operation 1709. In operation 1711, the electronic device 101 may identify whether the second measurement information satisfies a second condition which is an adjusted condition. If it is identified that the second condition is satisfied (1711—YES), the electronic device 101 may attempt to connect to the first base station in operation 1715. If it is identified that the second condition is not satisfied (1711—NO), the electronic device 101 may identify whether application time of the second condition is longer than or equal to threshold time in operation 1713. If it is identified that the application time is shorter than the threshold time (1713—NO), the electronic device 101 may repeat measurement for the first base station and the identification of whether the second condition is satisfied. If it is identified that the application time is longer than or equal to the threshold time (1715—YES), the electronic device 101 may repeat the measurement for the first base station and the identification of whether the first condition is satisfied. The electronic device 101 according to various embodiments may return a changed report condition to an original report condition (e.g., a report condition including threshold time identified from a network, or another report condition) if a predetermined time elapses.

Figure 18:
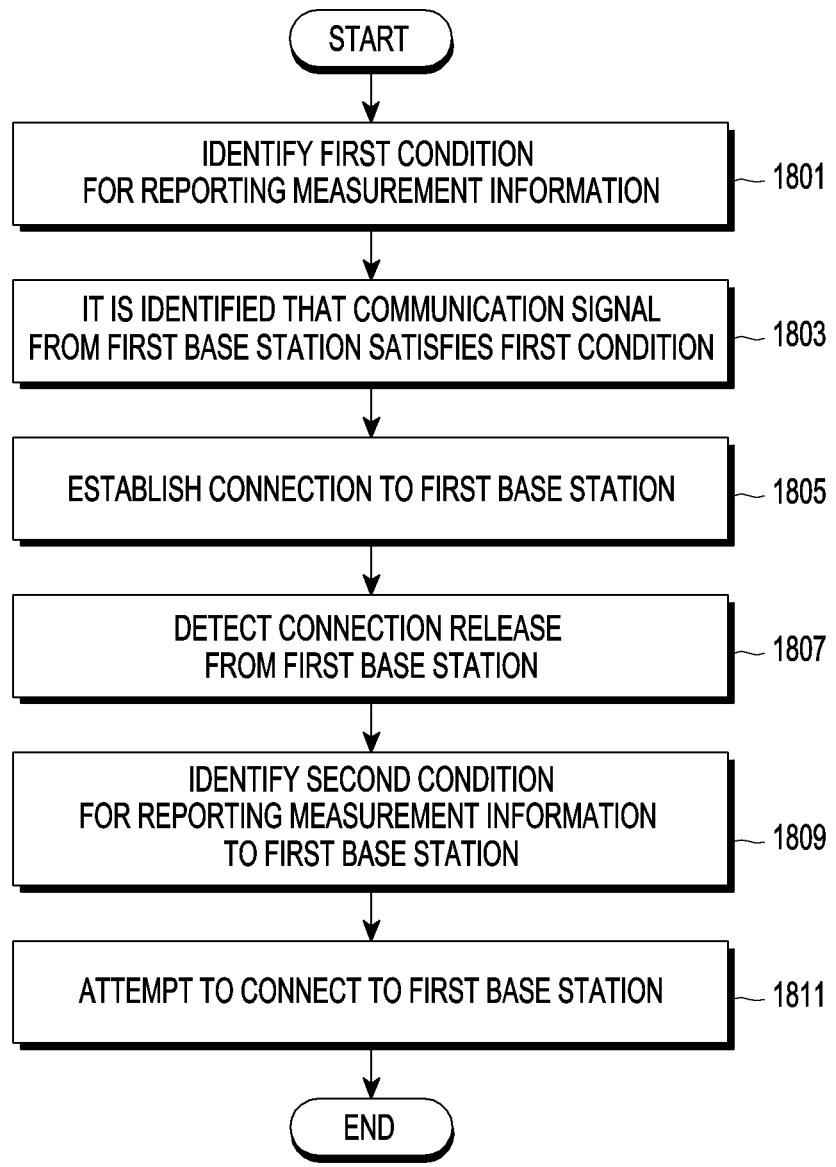
FIG. 18 illustrates a flowchart for describing an operating method of an electronic device according to an embodiment of the disclosure.

FIG. 18 illustrates a flowchart for describing an operating method of an electronic device according to an embodiment of the disclosure.

Referring to FIG. 18, an electronic device 101 (e.g., at least one communication processor 212, 214, and/or 260) may identify a first condition for reporting measurement information in operation 1801. In operation 1803, the electronic device 101 may identify that a communication signal from a first base station satisfies the first condition. In operation 1805, the electronic device 101 may establish a connection to the first base station. Although not shown, the electronic device 101 may, based on the satisfaction of the first condition, establish the connection to the first base station based on reporting measurement information to an MN 503, receiving an RRC connection reconfiguration message with SCG additional configuration from the MN 503, and performing a RACH procedure with the first base station (e.g., an SN 504).

According to various embodiments, in operation 1807, the electronic device 101 may detect a connection release from the first base station. For example, the connection release may be detected based on a radio link failure (RLF) (e.g., an RLF according to DL RLC max retransmission) by the first base station, or a synch failure (e.g., a failure type (0), (1), or (2)) by the electronic device 101. In operation 1809, the electronic device 101 may identify a second condition for reporting the measurement information to the first base station. If the second condition is satisfied, the electronic device 101 may attempt to connect to the first base station in operation 1811. A scheme in which the electronic device 101 sets the second condition may be at least partially the same as a scheme in which the second condition is set on detecting a RACH failure in FIG. 9A. Meanwhile, the electronic device 101 may set the second condition in consideration of a cause of a connection release. Those skilled in the art will readily understand that at least part of the scheme in which the second condition is set as described with reference to FIGS. 9A, 10, 11A, 11B, 12, 13, 14, 15, 16, and 17 may be also used for a case that the second condition is set on detecting a connection release.

Figure 19:
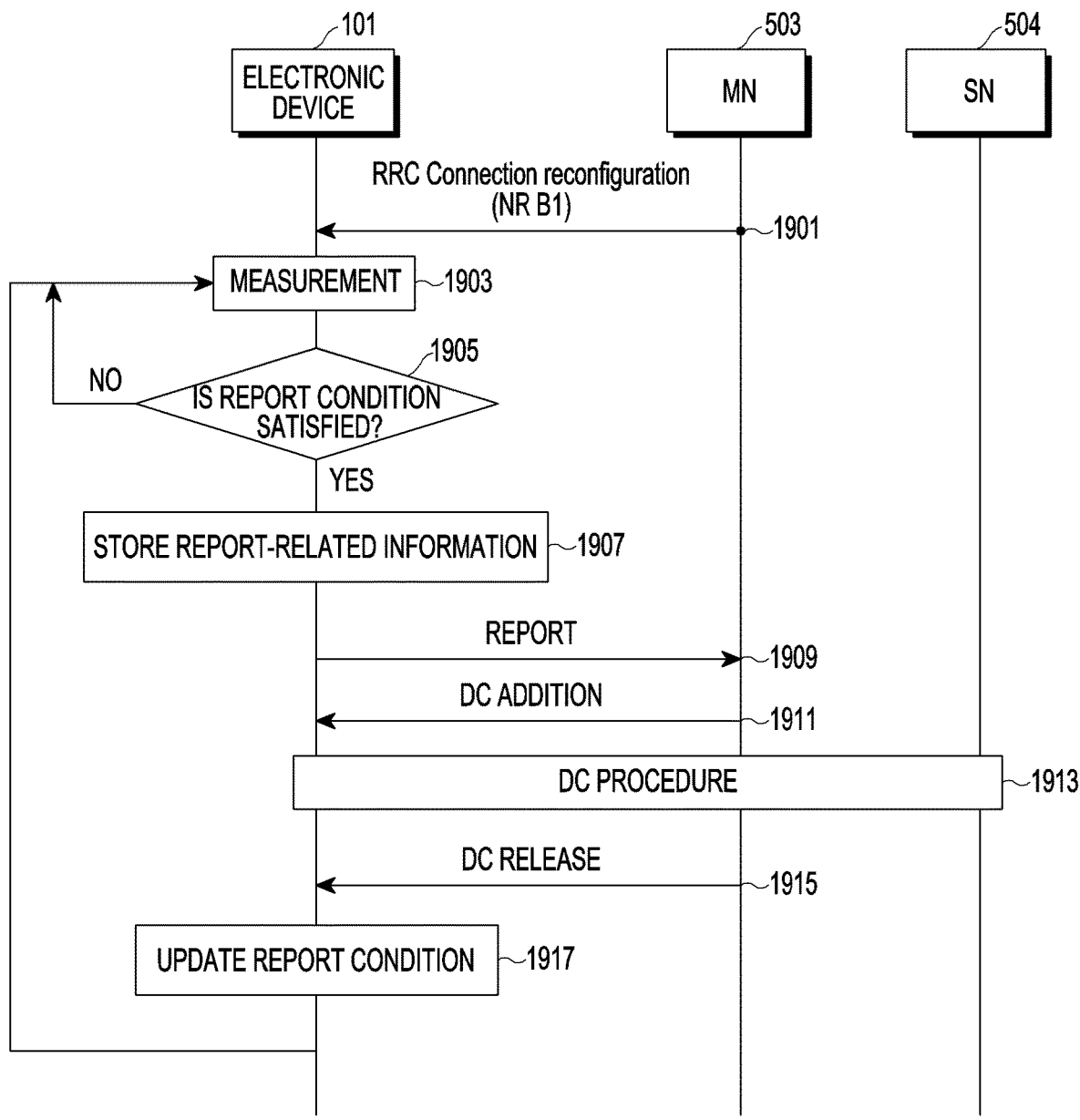
FIG. 19 illustrates a flowchart for describing an operating method of an electronic device according to an embodiment of the disclosure.

FIG. 19 illustrates a flowchart for describing an operating method of an electronic device according to an embodiment of the disclosure.

Referring to FIG. 19, an electronic device 101 (e.g., at least one communication processor 212, 214, and/or 260) may receive, from an MN 503, an RRC connection reconfiguration message including a report condition of an NR B1 event in operation 1901. The NR B1 event may be, for example, at least partially the same as an LTE B1 event described above. In operation 1903, the electronic device 101 may measure a signal from a neighbor cell. In operation 1905, the electronic device 101 may identify whether measurement information satisfies a report condition, for example, a report condition identified from a network. If it is identified that the report condition is not satisfied (1905—NO), the electronic device 101 may repeatedly perform the measurement and the identification of whether the report condition is satisfied. If it is identified that the report condition is satisfied (1905—YES), the electronic device 101 may store report-related information in operation 1907. The electronic device 101 may store the reported measurement information and/or information about report time, for example, in a report buffer. In operation 1909, the electronic device 101 may report the measurement information to the MN 503. In operation 1911, the electronic device 101 may receive a message instructing to add DC from the MN 503 (e.g., an RRC connection reconfiguration message with SCG addition configuration). In operation 1913, the electronic device 101 may perform a DC procedure. For example, the electronic device 101 may establish a connection with an SN 504 selected by the MN 503. The electronic device 101 may perform a RACH procedure with the selected SN 504 and establish an RRC connection. In operation 1915, the electronic device 101 may receive a message indicating a DC release (e.g., an RRC connection reconfiguration message with SCG configuration release) from the MN 503. The corresponding message may include information about the NR B1 event. In operation 1917, the electronic device 101 may update the report condition. In addition, the electronic device 101 may modify and/or add information within the report buffer. For example, the electronic device 101 may store information about release time, information about a count value of a ping-pong phenomenon, and/or information about a release cause in the report buffer. The information about the release time may be time taken from report time to connection release time. The information about the count value of the ping-pong phenomenon may be the number of times the ping-pong phenomenon occurs on a corresponding cell. The information about the release cause may be information indicating whether a communication release is caused by the network or a UE (or the electronic device 101). The electronic device 101 may update the report condition, for example, a threshold value in the report condition, based on the information in the report buffer. For example, if the release time is longer than threshold time (e.g., an RRC inactivity timer), the electronic device 101 may determine a new threshold value based on Equation 1.

$$\text{New } B1 \text{ threshold} = \text{best } B1 \text{ report value in buffer} + 1 \text{ (ping pong increase)} + \text{release cause (1 (NW) or 2 (UE))} \qquad \text{Equation 1}$$

In Equation 1, "New B1 threshold" represents a new threshold value, and "best B1 report value in buffer" may be the highest value among reported measurement information stored in the buffer. In Equation 1, "pingpong increase" is information indicating whether the pingpong phenomenon increases, and may have a value of 1 if the pingpong phenomenon increases, and a value of 0 if the pingpong phenomenon does not increase. In Equation 1, "release cause (1 (NW) or 2 (UE))" may have a value of 1 if the release cause indicates a release caused by the network (NW), and a value of 2 if the release cause indicates a release caused by the UE. The highest value among the reported measurement information stored in the buffer is used, so the electronic device 101 may set the new threshold value even if there is no measured value at a current time point.

If the release time is not longer than the threshold time (e.g., the RRC inactivity timer), the new threshold value may be determined based on Equation 2.

$$\text{New } B1 \text{ threshold} = \text{best } B1 \text{ report value in buffer} + 1 \text{ (ping pong increase)} + \text{release cause (1 (NW) or 2 (UE))} + 1 \text{ (less than 10 seconds)} \qquad \text{Equation 2}$$

In Equation 2, "less than 10 seconds" may have a value of 1 if threshold time is shorter than 10 seconds, and a value of 0 if the threshold time is longer than or equal to 10 seconds. The electronic device 101 according to various embodiments may determine the new threshold value based on Equation 1 or Equation 2, however those skilled in the art may easily understand that the electronic device 101 may determine the new threshold value using any of information stored in the report buffer without limitation.

Figure 20:
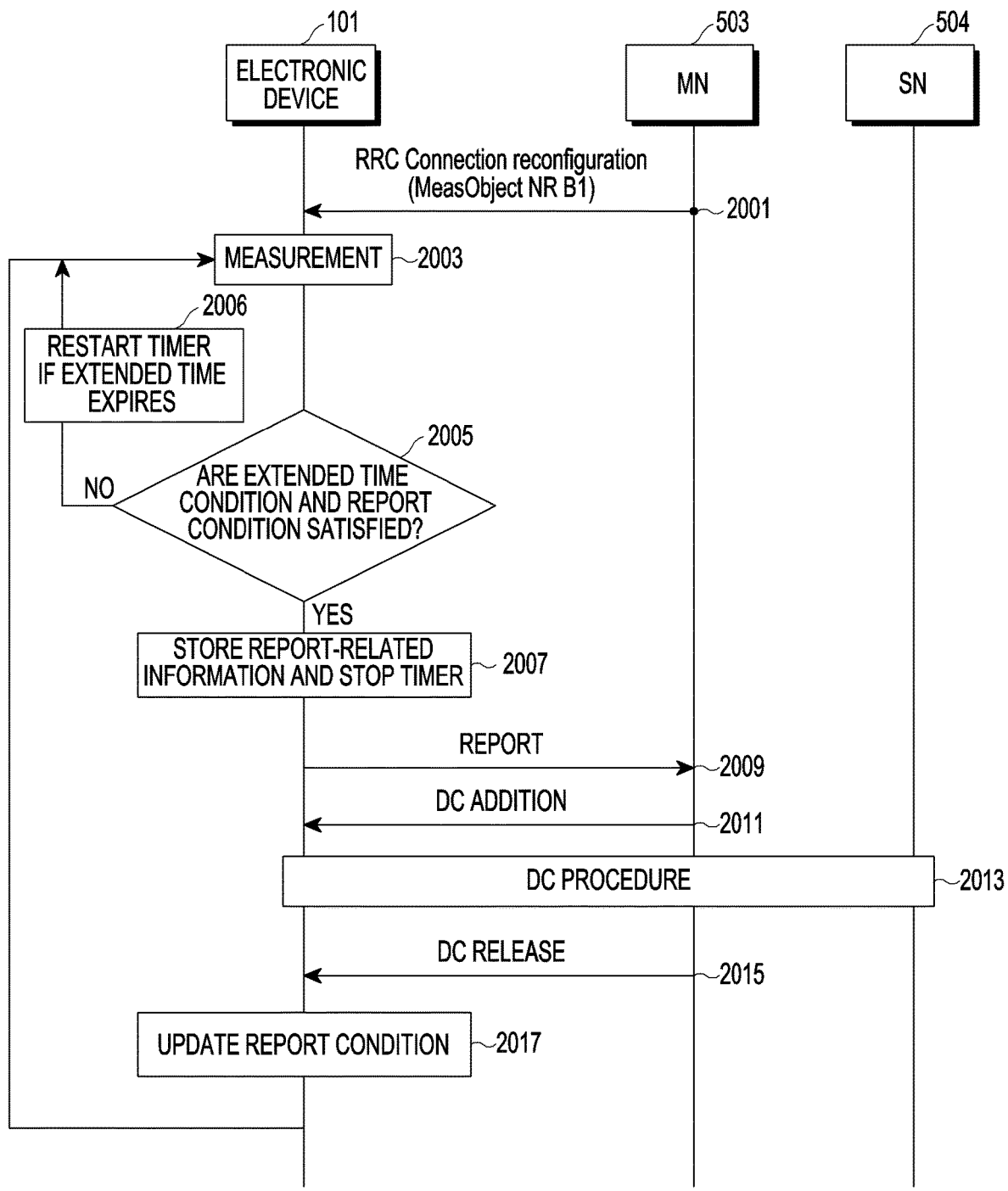
FIG. 20 illustrates a flowchart for describing an operating method of an electronic device according to an embodiment of the disclosure.

FIG. 20 illustrates a flowchart for describing an operating method of an electronic device according to an embodiment of the disclosure.

Referring to FIG. 20, an electronic device 101 (e.g., at least one communication processor 212, 214, and/or 260) may receive an RRC connection reconfiguration message including MO of an NR-B1 event from an MN 503 in operation 2001. In operation 2003, the electronic device 101 may perform measurement on a neighbor cell. In operation 2005, the electronic device 101 may identify whether an extended time condition and a report condition are satisfied in operation 2005. For example, the electronic device 101 may identify whether a timer related to extended time expires and whether a report condition identified from a network is satisfied. If it is identified that the extended time condition and the report condition are not satisfied (2005—NO), the electronic device 101 may restart the timer if the extended time expires in operation 2006. After restarting the timer, the electronic device 101 may repeat the measurement for the neighbor cell and the identification of whether the report condition is satisfied. If it is identified that the extended time condition and the report condition are satisfied (2005—YES), the electronic device 101 may store report-related information in, for example, a report buffer, and stop the timer in operation 2007. Accordingly, even though a new report condition is set, measurement information may be reported if it is identified that the report condition identified from the network is satisfied after the timer expires, so delay in reporting measurement information may be prevented even though a threshold value for the new report condition is set to a relatively large value. In operation 2005, if it is identified that the new report condition is satisfied, the electronic device 101 may report measurement information for a corresponding cell. Meanwhile, operations 2009, 2011, 2013, 2015, and 2017 may be performed in substantially the same or similar manner to operations 1909, 1911, 1913, 1915, and 1917 in FIG. 19, so a detailed description thereof will be omitted herein.

Figure 21:
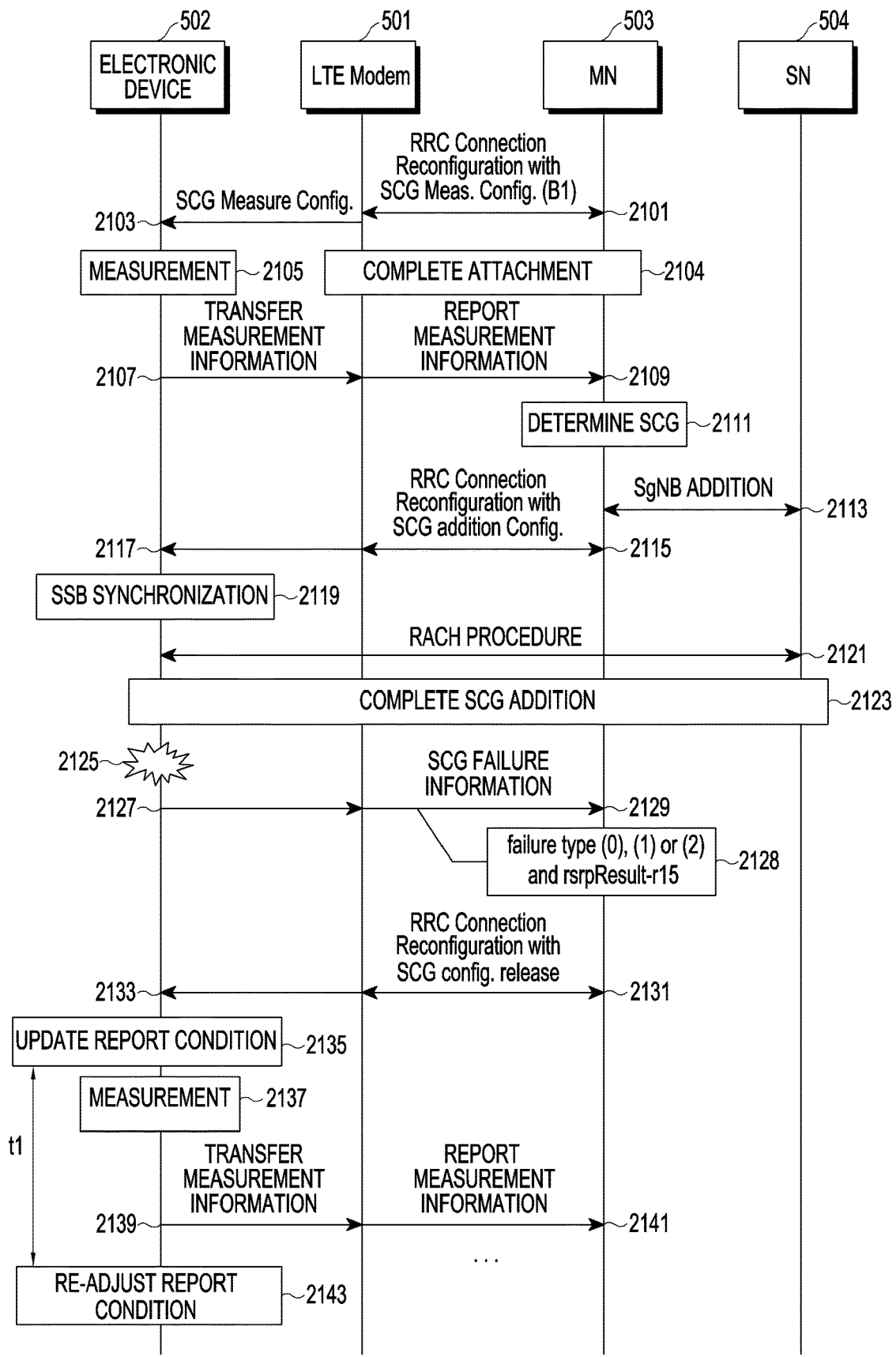
FIG. 21 illustrates a flowchart for describing an update on a report condition after a connection release according to an embodiment of the disclosure.

FIG. 21 illustrates a flowchart for describing an update on a report condition after a connection release according to an embodiment of the disclosure.

Referring to FIG. 21, an LTE modem 501 may receive an RRC connection reconfiguration message with SCG measure configuration (e.g., an NR-B1 event) from an MN 503 in operation 2101. In operation 2103, the LTE modem 501 may transfer configuration information to a 5G modem 502. The LTE modem 501 and the MN 503 may complete an attachment in operation 2104. The 5G modem 502 may perform measurement on a neighbor cell in operation 2105. If measurement information satisfies a report condition, the 5G modem 502 may transfer measurement information to the LTE modem 501 in operation 2107. The LTE modem 501 may report the measurement information to the MN 503 in operation 2109. In operation 2111, the MN 503 may determine an SCG (e.g., an SN 504). In operation 2113, the MN 503 and the SN 504 may perform an SgNB addition procedure. In operation 2115, the MN 503 may transmit an RRC connection reconfiguration message with SCG addition configuration to the LTE modem 501. The LTE modem 501 may transfer configuration information to the 5G modem 502 in operation 2117. In operation 2119, SSB synchronization may be performed. In operation 2121, the 5G modem 502 may perform a RACH procedure with the SN 504. In operation 2123, the 5G modem 502 may complete SCG addition.

According to various embodiments, the 5G modem 502 may detect an SCG failure in operation 2125. A type of the SCG failure may be, for example, (0), (1), or (2) type. In operation 2127, the 5G modem 502 may transfer failure information to the LTE modem 501. In operation 2129, the LTE modem 501 may report SCG failure information to the MN 503. SCG failure information 2128 may include, for example, a failure type (for example, one of (0), (1), or (2) types) and measurement information (for example, rsrpResult-r15). In operation 2131, the MN 503 may transmit an RRC connection reconfiguration message with SCG configuration release to the LTE modem 501. In operation 2133, the LTE modem 501 may transfer configuration information to the 5G modem 502. In operation 2135, the 5G modem 502 may update a report condition which corresponds to a base station (e.g., an SN 504) where a communication connection is released. In operation 2137, the 5G modem 502 may perform measurement on a neighbor cell. For example, if measurement information for the base station (e.g., the SN 504) where the communication connection is released satisfies the report condition, the 5G modem 502 may transfer the measurement information to the LTE modem 501 in operation 2139. The LTE modem 501 may report the measurement information to the MN 503 in operation 2141. On the other hand, if specified time t1 elapses, the 5G modem 502 may re-adjust the report condition in operation 2143. For example, the 5G modem 502 may return to the report condition included in the RRC connection reconfiguration message received in operation 2101, or the report condition included in the RRC connection reconfiguration message received in operation 2131.

Figure 22:
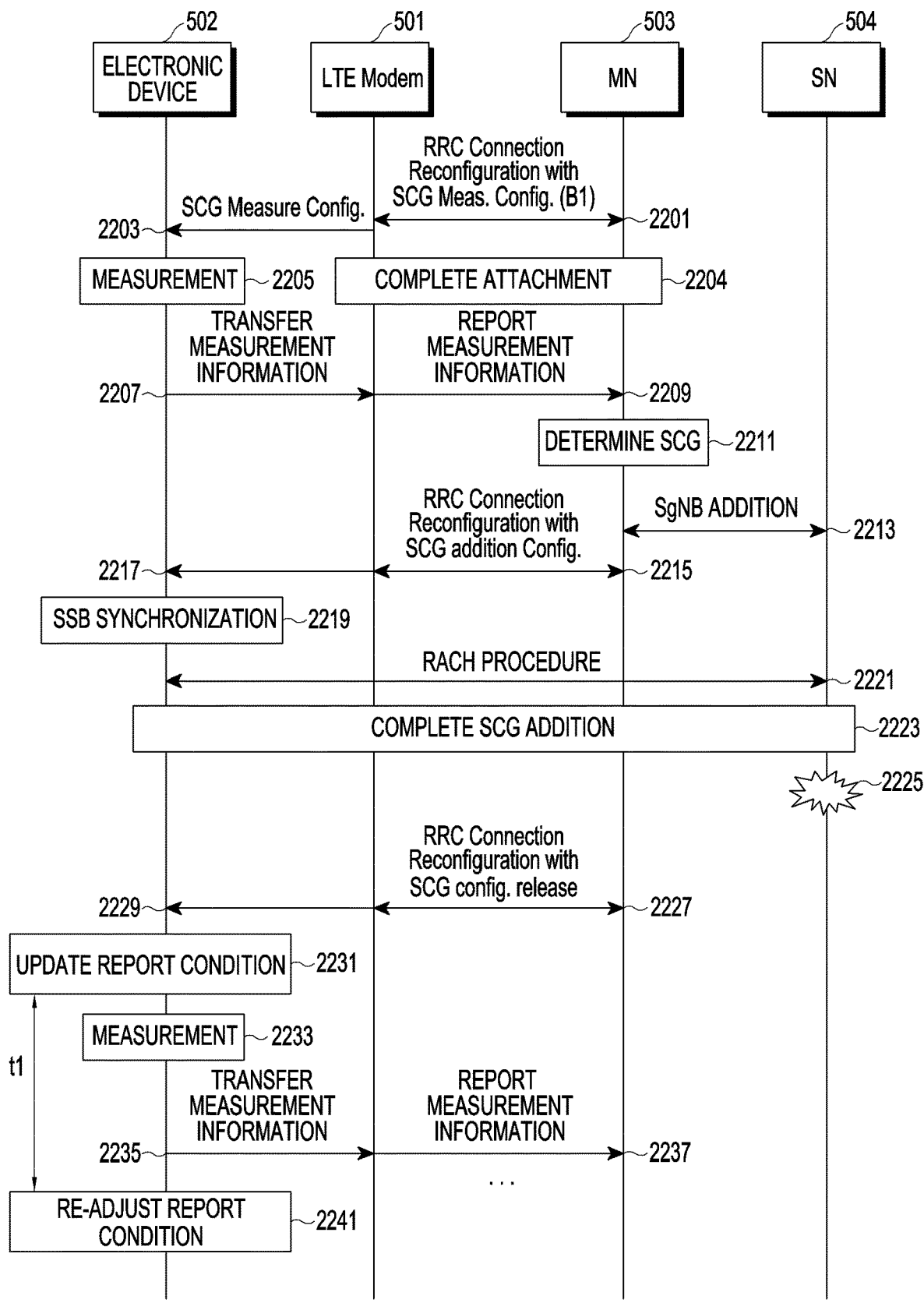
FIG. 22 illustrates a flowchart for describing an update on a report condition after a connection release according to an embodiment of the disclosure.

FIG. 22 illustrates a flowchart for describing an update on a report condition after a connection release according to an embodiment of the disclosure.

Referring to FIG. 22, operations 2201, 2203, 2204, 2205, 2207, 2209, 2211, 2213, 2215, 2217, 2219, 2221, and 2223 in FIG. 22 may be at least partially the same as operations 2101, 2103, 2104, 2105, 2107, 2109, 2111, 2113, 2115, 2117, 2119, 2121, and 2123 in FIG. 21, respectively, and a description thereof will be omitted herein.

According to various embodiments, an SN 504 may detect an SCG connection problem (e.g., DL RLC maximum retransmission) in operation 2225. In operation 2227, the MN 503 may transmit an RRC connection reconfiguration message with SCG configuration release to an LTE modem 501. The LTE modem 501 may transfer configuration information to a 5G modem 502 in operation 2229. In operation 2231, the 5G modem 502 may update a report condition which corresponds to a base station (e.g., the SN 504) where a communication connection is released. In operation 2233, the 5G modem 502 may perform measurement on a neighbor cell. For example, if measurement information for the base station (e.g., the SN 504) where the communication connection is released satisfies the report condition, the 5G modem 502 may transfer the measurement information to the LTE modem 501 in operation 2235. The LTE modem 501 may report the measurement information to the MN 503 in operation 2237. On the other hand, if specified time t1 elapses, the 5G modem 502 may re-adjust the report condition in operation 2241. For example, the 5G modem 502 may return to a report condition included in an RRC connection reconfiguration message received in operation 2201 or a report condition included in the RRC connection reconfiguration message received in operation 2227.

Figure 23A:
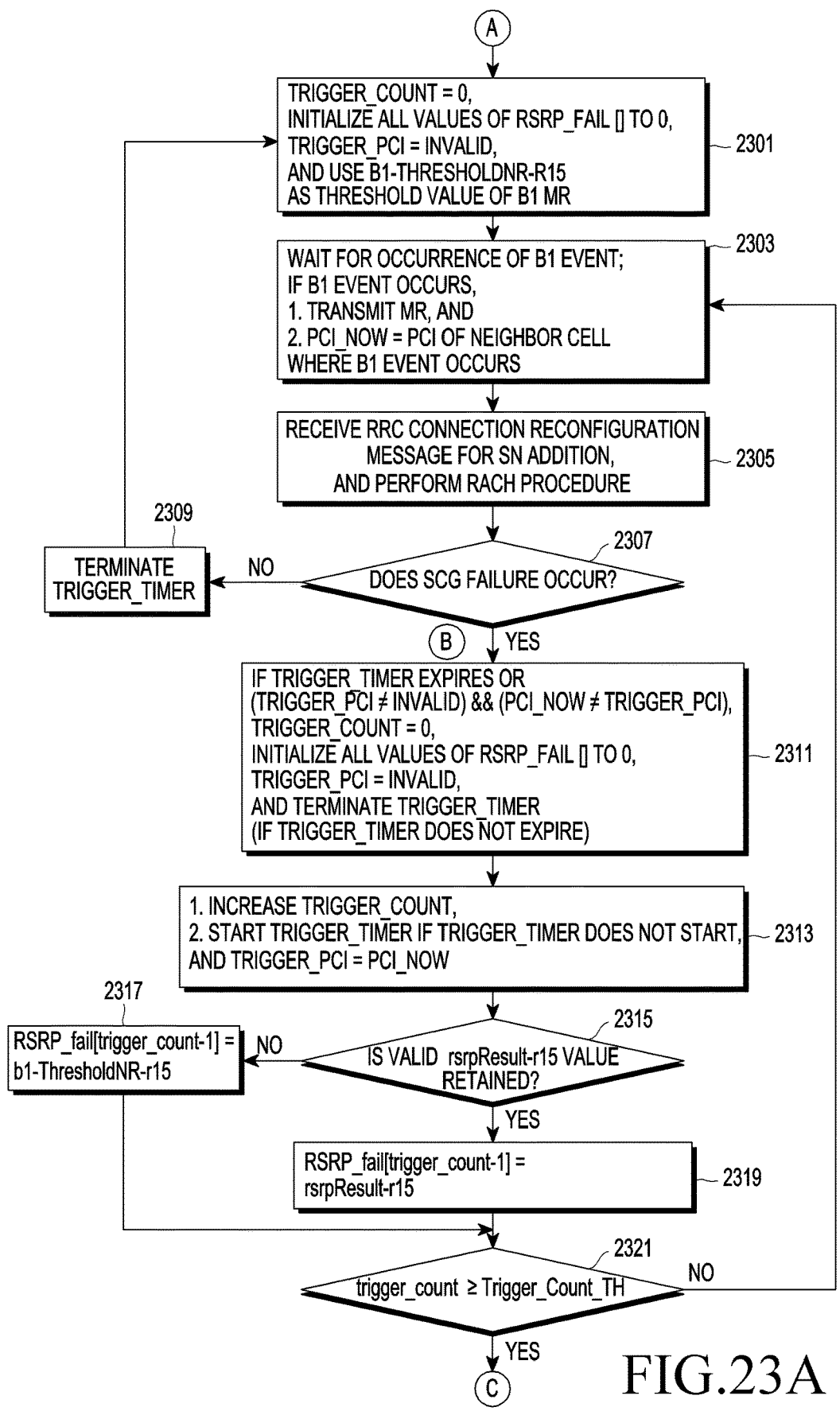
FIGS. 23A and 23B illustrate flowcharts for describing an operating method of an electronic device according to various embodiments of the disclosure.
Figure 23B:
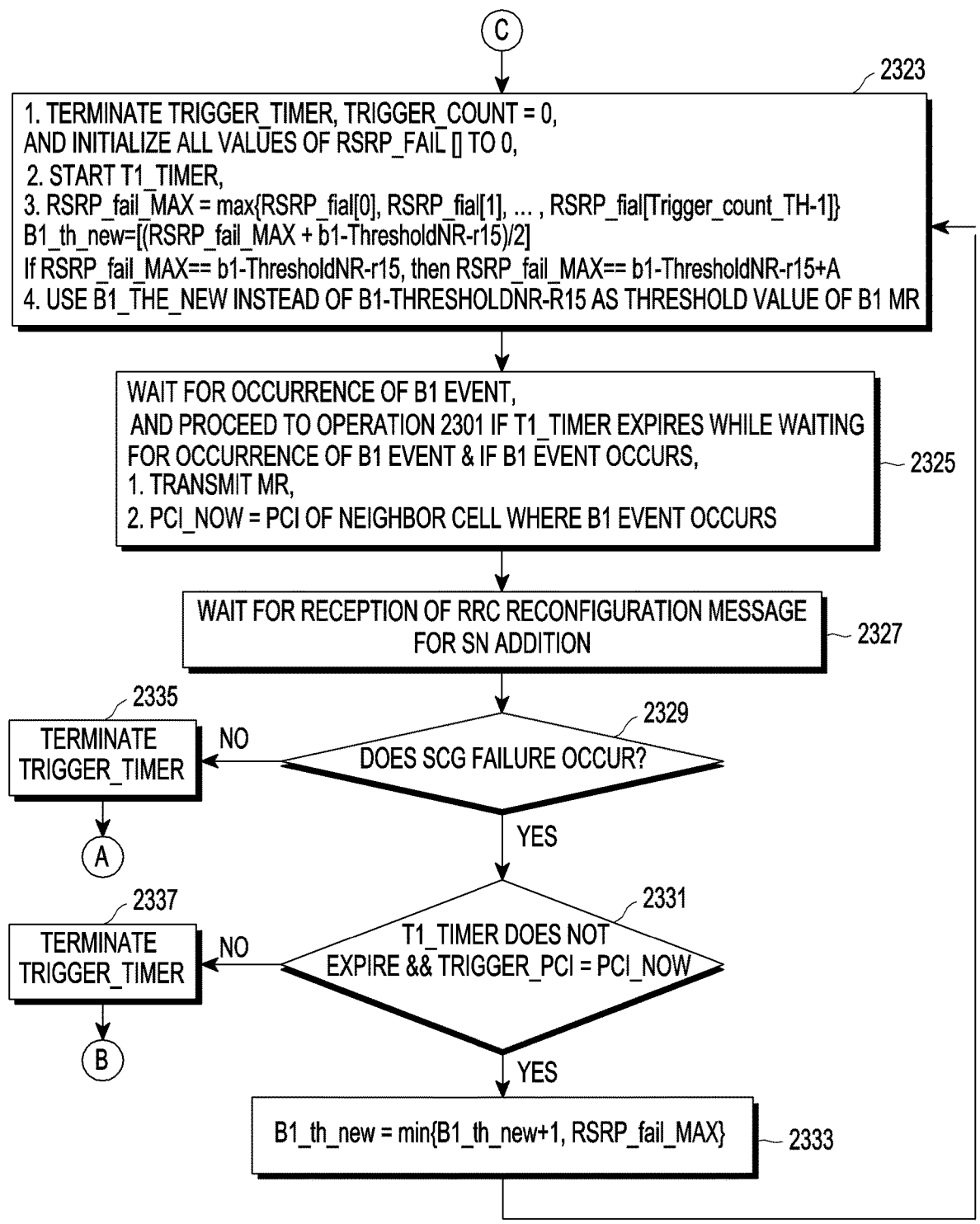
Figure 24A:
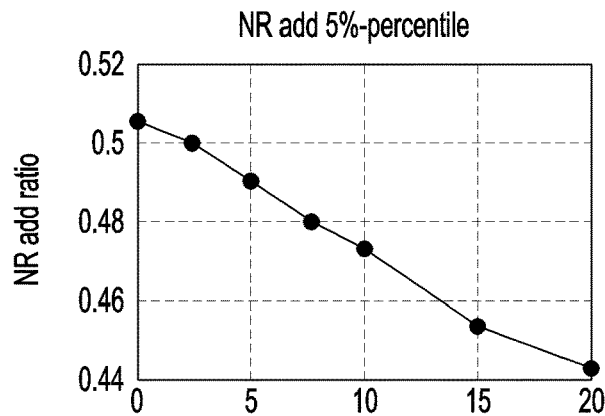
FIGS. 24A, 24B, 24C, 24D, 24E and 24F illustrate graphs for analyzing performance and comparative examples according to various embodiments of the disclosure.
Figure 24B:
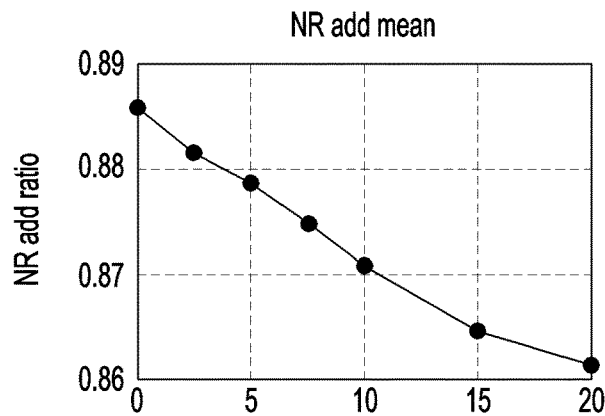
Figure 24C:
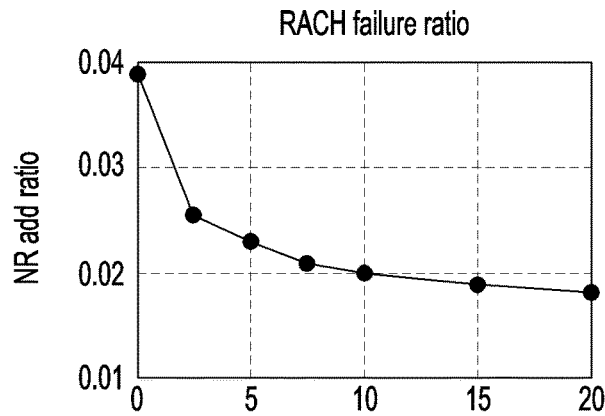
Figure 24D:
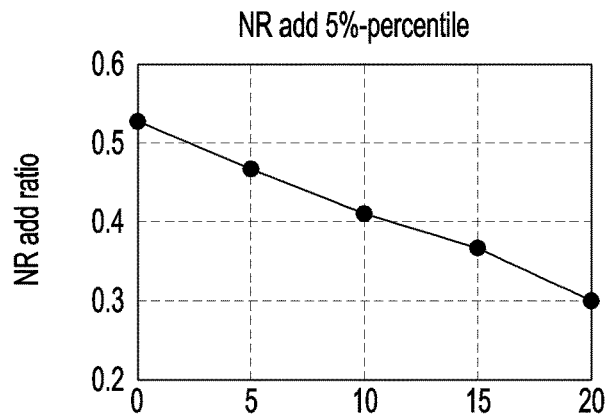
Figure 24E:
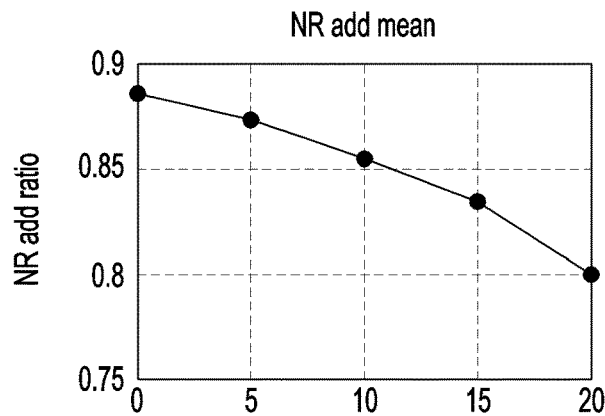
Figure 24F:
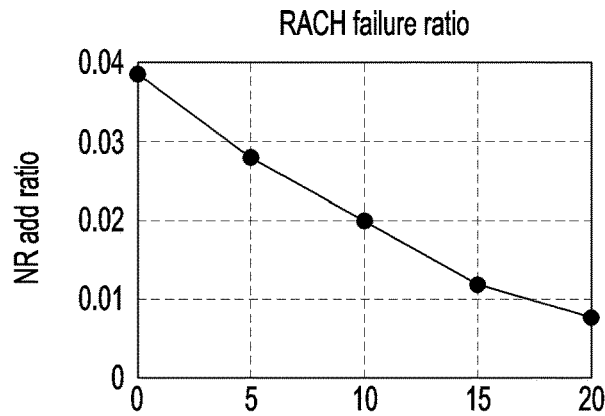

FIGS. 23A and 23B illustrate flowcharts for describing an operating method of an electronic device according to various embodiments of the disclosure.

Referring to FIGS. 23A and 23B, in operation 2301, an electronic device 101 (e.g., at least one communication processor 212, 214, and/or 260) may set trigger_count to 0, initialize all values of RSRP fail [ ] to 0, and set Trigger_PCI to "INVALID". Here, the trigger_count may be a value which increases by 1 whenever a RACH failure occurs, and the RSRP fail [ ] may be an RSRP value which is reported when an algorithm operation condition is satisfied. The Trigger_PCI may be a PCI of a cell which first satisfies an operation condition after an algorithm reset.

According to various embodiments, in operation 2303, the electronic device 101 may wait for an occurrence of a B1 event. If the occurrence of the B1 event is identified, the electronic device 101 may transmit a measurement report (MR) to an MN and set PCI_now (a PCI currently attempting a RACH procedure according to an occurrence of a B1 event) to a PCI of a neighbor cell where the B1 event occurs. In operation 2305, the electronic device 101 may receive an RRC connection reconfiguration message for SN addition, and perform a RACH procedure. In operation 2307, the electronic device 101 may identify whether an SCG failure occurs. If the SCG failure is not identified (2307—NO), the electronic device 101 may terminate trigger_timer in operation 2309. The trigger_timer may be waiting time for an increase in trigger_count, and if the trigger_timer expires, the trigger_count may be reset to 0. In various embodiments, the trigger_timer may be reset if the RACH procedure is successful.

According to various embodiments, if the SCG failure is identified (2307—YES), the electronic device 101 proceeds to operation 2311. In operation 2311, the electronic device 101 may set the trigger count to 0, initialize all values of RSRP fail [ ] to 0, and set the Trigger_PCI to "INVALID" if the trigger_timer expires, or the Trigger_PCI is "INVALID" and the PCI_now is the Trigger_PCI. If the trigger_timer does not expire, the electronic device 101 may terminate the trigger_timer. In operation 2313, the electronic device 101 may increase the trigger_count. If the trigger_timer is not started, the electronic device 101 may start the trigger_timer and set the Trigger_PCI to the PCI_now.

In operation 2315, the electronic device 101 according to various embodiments may identify whether a valid rsrpResult r15 value is retained (or, set or stored). A rsrpResult r15 value may be a currently received (or measured) RSRP value which the electronic device 101 transmits in the MR. If it is identified that the valid rsrpResult r15 value is not retained (2315—NO), the electronic device 101 may set a value of RSRP fail [trigger_count=1] to b1-ThresholdNR-r15 in operation 2317. The b1-ThresholdNR-r15 may be a threshold value of a B1 event identified from a network, e.g., a B1 event identified based on an RRC connection reconfiguration message. If it is identified that the valid rsrpResult r15 value is retained (2315—YES), the electronic device 101 may set the value of RSRP fail [trigger_count=1] to the rsrpResult_r15 value in operation 2319. In operation 2321, the electronic device 101 may identify whether trigger_count is greater than or equal to Trigger_Count_TH. The Trigger_Count_TH is a threshold value for the trigger_count, and an algorithm may be triggered if the trigger_count is increased to reach this value. If it is identified that the trigger_count is less than the Trigger_Count_TH (2321—NO), the electronic device 101 may perform operation 2303 again. If it is identified that the trigger_count is greater than or equal to the Trigger_Count_TH (2321—YES), the electronic device 101 may proceed to operation 2323.

According to various embodiments, the electronic device 101 may terminate the trigger_timer set the trigger_count to 0, and initialize all values of the RSRP fail [ ] to 0 in operation 2323. The electronic device 101 may start a t1 timer. The t1 timer may be a period when B1_th_new (an event B1 threshold value changed according to triggering of an algorithm) is applied instead of the b1-ThresholdNR-r15. If the t1 timer expires, the b1-ThresholdNR-r15 may be used again. The electronic device 101 may identify a maximum value (RSRP fail MAX) among values of RSRP fail (RSRP fail [0], RSRP fail [1], RSRP fail [0], RSRP fail [Th−1]). The electronic device 101 may set the B1_th_new to (RSRP fail MAX+b1-ThresholdNR-r15)/2. The electronic device 101 according to various embodiments may set a new threshold value using RSRP identified on a failure and a threshold value identified from a network. If the RSRP fail MAX is equal to the b1-ThresholdNR-r15, the electronic device 101 may set the RSRP fail MAX to a value which is greater than the b1-ThresholdNR-r15 by a specified value (e.g., A). The electronic device 101 may then set a threshold value B1 for the MR to B1_th_new instead of the b1-ThresholdNR-r15.

According to various embodiments, the electronic device 101 may wait for an occurrence of the B1 event in operation 2325, and may proceed to operation 2301 if the t1_timer expires while waiting for the occurrence of the B1 event. If it is identified that the B1 event occurs, the electronic device 101 may transmit an MR to the MN, and may set the PCI_now to a PCI of a neighbor cell where the B1 event occurs. In operation 2327, the electronic device 101 may wait to receive an RRC connection reconfiguration message for SN addition. In operation 2329, the electronic device 101 may identify whether an SCG failure occurs.

According to various embodiments, if it is identified that the SCG failure occurs (2329—YES), the electronic device 101 may identify whether a condition indicating that the t1 timer did not expire and a condition indicating that the trigger_PCI is the PCI_now are satisfied in operation 2331. If it is identified that both conditions are satisfied (2331—YES), the electronic device 101 may set the B1_th_new to a minimum value between a value that the B1_Tth new increases by a specified value (e.g., 1) and the RSRP fail MAX. If the SCG failure is not identified (2329—NO), the electronic device 101 may terminate the t1 timer in operation 2335, and proceed to operation 2301. If it is identified that one of both conditions in operation 2331 is not satisfied (2331—NO), the electronic device 101 may terminate the t1 timer, and set the MR threshold value of B1 to the b1-ThresholdNR-r15 in operation 2337. Thereafter, the electronic device 101 may proceed to operation 2311.

As described above, if the SCG failure is identified, the electronic device 101 according to various embodiments may store a PCI of a corresponding cell and RSRP on the failure. If the SCG failure occurs as many times as Trigger_count_TH within the same PCI trigger_timer time, the electronic device 101 may internally set an event B1 threshold value to a maximum value of RSRPs recorded on the failure or an intermediate value between the recorded RSRP and the b1-ThresholdNR-r15. Accordingly, the number of RACH attempts predicted to fail may decrease, so power may be saved. In addition, the newly set event B1 threshold value may not be continuously maintained, and may be initialized if another PCI is detected or a predetermined period (e.g., the t1 timer) expires.

As described above, the trigger_count may be initialized if another PCI is detected while the trigger_count is updated for one PCI. According to various embodiments, the electronic device 101 may store a plurality of PCIs and apply a separate MR condition changing algorithm to each of the PCIs.

FIGS. 24A to 24F illustrate graphs for analyzing performance according to various embodiments and comparative examples according to various embodiments of the disclosure. An experimental environment may be as shown in Table 3.

TABLE 3 free-space field 150 × 150 [m]
BS position (75,75), height 20 [m]
UE height 1.5 [m]
Pathloss model: COST 231 Hata model
Received target power −93 dBm
SSB tx power 13 dBm
Event B1 threshold −100 dBm
Max tx power 20 dBm
Center freq. 3.6 GHz
For each TTI, each UE randomly moves by N (0, 52) on x and y axes
UL-DL mismatch is generated by taking 10 TTI-moving average after generating an N (0, 52) random variable to have time correlation.

In a given experimental environment, if a scheme according to various embodiments and a hysteresis scheme defined in a standard are not used (t1=0, Hys=0), a RACH failure ratio may be about 4%. If t1 is set to 2.5 seconds using the scheme according to various embodiments (t1=2.5 seconds, and Hys=0), the RACH failure ratio may be improved to 2.5%, and there may be little degradation of an NR add mean (an average NR add success probability) value or NR add 5%-percentile (an average NR add success probability of UEs which are lower 5% in terms of channel quality) compared to a result without applying the corresponding scheme.

Referring to FIGS. 24A to 24F, in addition, NR add mean and NR add 5%-percentile increase compared to a case that a 2.5% improvement in the RACH failure ratio is obtained using the hysteresis scheme defined in the standard (t1=0, Hys=0.7), and this may be identified with reference to FIGS. 24A to 24F. The comparison for performance may be as shown in Table 4.

TABLE 4

| Applied scheme | RACH failure ratio | NR add mean | NR add 5%-percentile |
| --- | --- | --- | --- |
| Scheme that does not use a hysteresis scheme and a scheme according to an embodiment | about 4% | about 88.5% | about 50.5% |
| Hysteresis scheme | 2.5% | 86.5% | 45% |
| Scheme according to an embodiment | 2.5% | 88.1% | 50% |

It will be understood by those skilled in the art that the result shows only an improvement in performance, and does not limit an embodiment of the disclosure.

Various embodiments may provide an electronic device capable of adjusting a report condition from a report condition received from an MN (e.g., a report condition in an RRC connection reconfiguration message) to another report condition, and an operating method thereof. So, a possibility of resources and power waste in a UE caused by the UE continuously attempting to establish a connection with an SN having a high probability of failure in a RACH procedure and/or a connection release may be reduced.

An electronic device according to various embodiments is disclosed, and the electronic device includes a first communication processor configured to support a first network communication with a first network, and a second communication processor configured to support a second network communication with a second network different from the first network. The second communication processor may be configured to: receive, from the first communication processor, a first report condition for measurement information for a signal from at least one base station which corresponds to the second network communication, identify a second report condition which corresponds to connection failure of the electronic device to a first base station corresponding to the second network communication, based on identification of the connection failure to the first base station, in a case that first measurement information for a signal from the first base station satisfies the second report condition, transfer the first measurement information to the first communication processor, and, based on a fact that the connection failure to the first base station is not identified, in a case that the first measurement information for the signal from the first base station satisfies the first report condition, transfer the first measurement information to the first communication processor, and the first communication processor may be configured to transmit, to a base station which corresponds to the first network communication, the first measurement information received from the second communication processor.

According to various embodiments, the second communication processor may be configured to: based on the identification of the connection failure to the first base station, in a case that the second report condition is not satisfied, refrain from transferring the first measurement information to the first communication processor.

According to various embodiments, based on the identification of the connection failure to the first base station, in a case that the second report condition is not satisfied even though the first report condition is satisfied, the second communication processor may refrain from transferring the first measurement information to the first communication processor.

According to various embodiments, the first report condition may indicate whether a value of the first measurement information is greater than a first threshold value, and the second report condition may indicate whether the value of the first measurement information is greater than a second threshold value different from the first threshold value.

According to various embodiments, the second communication processor may be configured to set one of measurement information reported corresponding to the connection failure to the first base station or a value which is calculated from the measurement information reported corresponding to the connection failure as the second threshold value.

According to various embodiments, the second communication processor may be configured to set a value calculated from the first threshold value as the second threshold value.

According to various embodiments, as at least part of the operation of transferring the first measurement information to the first communication processor in a case that the first measurement information satisfies the second report condition based on the identification of the connection failure to the first base station, the second communication processor may be configured to: based on a fact that the first measurement information satisfies the second report condition and a number of the connection failure to the first base station is greater than or equal to a threshold count, transfer the first measurement information to the first communication processor.

According to various embodiments, the second communication processor may be configured to: upon identifying that a value of the first measurement information is greater than a specified third threshold value in a case that the first measurement information does not satisfy the second report condition based on the identification of the connection failure to the first base station, transfer the first measurement information to the first communication processor.

According to various embodiments, as at least part of the operation of transferring the first measurement information to the first communication processor in a case that the first measurement information satisfies the second report condition based on the identification of the connection failure to the first base station, the second communication processor may be configured to: in a case that the first measurement information satisfies the second report condition during a specified time duration, transfer the first measurement information to the first communication processor, and the second communication processor may be configured to: when the specified time duration elapses, in a case that the first measurement information for the signal from the first base station having a history of connection failure satisfies the first report condition, transfer the first measurement information to the first communication processor.

An electronic device according to various embodiments is disclosed, and the electronic device includes a first communication processor configured to support a first network communication with a first network, and a second communication processor configured to support a second network communication with a second network different from the first network. The second communication processor may be configured to: receive, from the first communication processor, a first report condition for measurement information for a signal from at least one base station which corresponds to the second network communication, identify a second report condition which corresponds to a connection release of the electronic device from a first base station which corresponds to the second network communication, based on identification of the connection release from the first base station after a connection to the first base station is established, in a case that first measurement information for a signal from the first base station satisfies the second report condition, transfer the first measurement information to the first communication processor, and based on a fact that the connection release from the first base station is not identified, in a case that the first measurement information for the signal from the first base station satisfies the first report condition, transfer the first measurement information to the first communication processor, and the first communication processor may be configured to transmit, to a base station which corresponds to the first network communication, the first measurement information received from the second communication processor.

According to various embodiments, the second communication processor may be configured to: based on the identification of the connection release from the first base station, in a case that the second report condition is not satisfied, refrain from transferring the first measurement information to the first communication processor.

According to various embodiments, based on the identification of the connection release from the first base station, in a case that the second report condition is not satisfied even though the first report condition is satisfied, the second communication processor may refrain from transferring the first measurement information to the first communication processor.

According to various embodiments, the first report condition may indicate whether a value of the first measurement information is greater than a first threshold value, and the second report condition may indicate whether the value of the first measurement information is greater than a second threshold value different from the first threshold value.

According to various embodiments, the second communication processor may be configured to set, as the second threshold value, one of measurement information reported in response to the connection release from the first base station or a value which is calculated from the measurement information reported in response to the connection release.

According to various embodiments, the second communication processor may be configured to set a value calculated from the first threshold value as the second threshold value.

According to various embodiments, the second communication processor may be configured to identify the second threshold value by applying a value which is identified based on at least one of a cause of the connection release from the first base station or time taken until the connection release occurs to a largest value of at least one measurement information value which corresponds to the first base station.

According to various embodiments, the second communication processor may be configured to: upon identifying that a value of the first measurement information is greater than a specified third threshold value in a case that the first measurement information does not satisfy the second report condition based on the identification of the connection release from to the first base station, transfer the first measurement information to the first communication processor.

According to various embodiments, as at least part of the operation of transferring the first measurement information to the first communication processor in a case that the first measurement information satisfies the second report condition based on the identification of the connection release from the first base station, the second communication processor may be configured to: in a case that the first measurement information satisfies the second report condition during a specified time duration, transfer the first measurement information to the first communication processor, and the second communication processor may be configured to: when the specified time duration elapses, in a case that the first measurement information for the signal from the first base station having a history of connection release satisfies the first report condition, transfer the first measurement information to the first communication processor.

An electronic device according to various embodiments is disclosed, and the electronic device includes a first communication processor configured to support a first network communication with a first network, and a second communication processor configured to support a second network communication with a second network different from the first network. The second communication processor may be configured to: receive, from the first communication processor, a first threshold value for identifying whether to report information for a signal from at least one base station which corresponds to the second network communication, in a case that connection failure to a first base station which corresponds to the second network communication is not identified, transfer, to the first communication processor, a first measurement value for a signal from a first base station to report the first measurement value based on the first measurement value being greater than the first threshold value, and in a case that the connection failure to the first base station is identified, transfer the first measurement value to the first communication processor to report the first measurement value based on the first measurement value being greater than a second threshold value related to the connection failure.

According to various embodiments, the first measurement value may not be reported to a base station in a case that the first measurement value is greater than the first threshold value and less than or equal to the second threshold value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry", etc. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first communication processor configured to support a first network communication with a first network; and
   a second communication processor configured to support a second network communication with a second network different from the first network,
   wherein the second communication processor is further configured to:
      receive, from the first communication processor, a first report condition for measurement information for a signal from at least one base station corresponding to the second network communication, wherein the first communication processor identifies the first report condition based on a message received from a base station supporting the first network communication before a connection between a first base station corresponding to the second network communication and the electronic device through the second network communication is established,
      identify a second report condition corresponding to a connection failure of the electronic device to the first base station corresponding to the second network communication, based on an identification of the connection failure to the first base station, in a case that first measurement information for a signal from the first base station satisfies the second report condition, transfer the first measurement information to the first communication processor, and based on the connection failure to the first base station not being identified, in a case that the first measurement information for the signal from the first base station satisfies the first report condition, transfer the first measurement information to the first communication processor, and wherein the first communication processor is further configured to transmit, to the base station corresponding to the first network communication for establishment of the first base station and the electronic device through the second network communication, the first measurement information received from the second communication processor.

2. The electronic device of claim 1, wherein the second communication processor is further configured based on the identification of the connection failure to the first base station, in a case that the second report condition is not satisfied, refrain from transferring the first measurement information to the first communication processor.

3. The electronic device of claim 1, wherein the second communication processor is further configured to, based on the identification of the connection failure to the first base station, in a case that the second report condition is not satisfied and the first report condition is satisfied, refrain from transferring the first measurement information to the first communication processor.

4. The electronic device of claim 1,
wherein the first report condition indicates whether a value of the first measurement information is greater than a first threshold value, and
wherein the second report condition indicates whether the value of the first measurement information is greater than a second threshold value different from the first threshold value.

5. The electronic device of claim 4, wherein the second communication processor is further configured to set, as the second threshold value, one of measurement information reported in response to the connection failure to the first base station or a value calculated from the measurement information reported in response to the connection failure.

6. The electronic device of claim 4, wherein the second communication processor is further configured to set a value calculated from the first threshold value as the second threshold value.

7. The electronic device of claim 1, wherein the second communication processor is further configured to, as at least part of the transferring of the first measurement information to the first communication processor, based on the first measurement information satisfying the second report condition and a number of connection failures to the first base station being greater than or equal to a threshold count, transfer the first measurement information to the first communication processor.

8. The electronic device of claim 1, wherein the second communication processor is further configured to, based on the identification of the connection failure to the first base station, in a case that the first measurement information does not satisfy the second report condition, transfer the first measurement information to the first communication processor in response to identifying that a value of the first measurement information is greater than a specified third threshold value.

9. The electronic device of claim 1, wherein the second communication processor is further configured to:
as at least part of the transferring of the first measurement information to the first communication processor in a case that the first measurement information satisfies the second report condition during a specified time duration and based on the identification of the connection failure to the first base station, transfer the first measurement information to the first communication processor, and
in response to the specified time duration elapsing, in a case that the first measurement information for the signal from the first base station having a history of connection failures satisfies the first report condition, transfer the first measurement information to the first communication processor.

10. An electronic device comprising:
a first communication processor configured to support a first network communication with a first network; and
a second communication processor configured to support a second network communication with a second network different from the first network,
wherein the second communication processor is further configured to:
receive, from the first communication processor, a first report condition for measurement information for a signal from at least one base station corresponding to the second network communication, wherein the first communication processor identifies the first report condition based on a message received from a base station supporting the first network communication before a connection between a first base station corresponding to the second network communication and the electronic device through the second network communication is established,
identify a second report condition corresponding to a connection release of the electronic device from the first base station corresponding to the second network communication,
based on an identification of the connection release from the first base station after establishing a connection to the first base station, in a case that first measurement information for a signal from the first base station satisfies the second report condition, transfer the first measurement information to the first communication processor, and
based on the connection release from the first base station not being identified, in a case that the first measurement information for the signal from the first base station satisfies the first report condition, transfer the first measurement information to the first communication processor, and
wherein the first communication processor is further configured to transmit, to the base station corresponding to the first network communication for establishment of the first base station and the electronic device through the second network communication, the first measurement information received from the second communication processor.

11. The electronic device of claim 10, wherein the second communication processor is further configured based on the identification of the connection release from the first base station, in a case that the second report condition is not satisfied, refrain from transferring the first measurement information to the first communication processor.

12. The electronic device of claim 10, wherein the second communication processor is further configured to, based on the identification of the connection release from the first base station, in a case that the second report condition is not satisfied even though the first report condition is satisfied, refrain from transferring the first measurement information to the first communication processor.

13. The electronic device of claim 10,
wherein the first report condition indicates whether a value of the first measurement information is greater than a first threshold value, and
wherein the second report condition indicates whether the value of the first measurement information is greater than a second threshold value different from the first threshold value.

14. The electronic device of claim 13, wherein the second communication processor is further configured to set, as the second threshold value, one of measurement information reported in response to the connection release from the first base station or a value calculated from the measurement information reported in response to the connection release.

15. The electronic device of claim 13, wherein the second communication processor is further configured to set a value calculated from the first threshold value as the second threshold value.

16. The electronic device of claim 13, wherein the second communication processor is further configured to identify the second threshold value by applying a value identified based on at least one of a cause of the connection release from the first base station or time taken until the connection release occurs to a largest value of at least one measurement information value corresponding to the first base station.

17. The electronic device of claim 10, wherein the second communication processor is further configured to, in response to identifying that a value of the first measurement information is greater than a specified third threshold value, in a case that the first measurement information does not satisfy the second report condition based on the identification of the connection release from to the first base station, transfer the first measurement information to the first communication processor.

18. The electronic device of claim 10, wherein the second communication processor is further configured to:
as at least part of the transferring of the first measurement information to the first communication processor, in a case that the first measurement information satisfies the second report condition during a specified time duration and based on the identification of the connection release from the first base station, transfer the first measurement information to the first communication processor, and
in response to the specified time duration elapsing, in a case that the first measurement information for the signal from the first base station having a history of connection releases satisfies the first report condition, transfer the first measurement information to the first communication processor.

19. An electronic device comprising:
a first communication processor configured to support a first network communication with a first network; and
a second communication processor configured to support a second network communication with a second network different from the first network,
wherein the second communication processor is further configured to:
receive, from the first communication processor, a first threshold value for identifying whether to report information for a signal from at least one base station corresponding to the second network communication, wherein the first communication processor identifies a first report condition based on a message received from a base station supporting the first network communication before a connection between a first base station corresponding to the second network communication and the electronic device through the second network communication is established,
in a case that a connection failure to the first base station corresponding to the second network communication is not identified, transfer, to the first communication processor, a first measurement value for a signal from the first base station to report the first measurement value based on the first measurement value being greater than the first threshold value, and
in a case that the connection failure to the first base station is identified, transfer the first measurement value to the first communication processor to report the first measurement value based on the first measurement value being greater than a second threshold value related to the connection failure, and
wherein the first communication processor is further configured to transmit, to the base station corresponding to the first network communication for establishment of the first base station and the electronic device through the second network communication, first measurement information received from the second communication processor.

20. The electronic device of claim 19, wherein the first measurement value is not reported to a base station in a case that the first measurement value is greater than the first threshold value and less than or equal to the second threshold value.

21. The electronic device of claim 19, wherein the second communication processor is further configured to generate the second threshold value from the first threshold value based on a number of times an occurrence of a ping-pong phenomenon increases.

22. The electronic device of claim 19, wherein the second communication processor is further configured to generate the second threshold value by adding an offset value corresponding to a channel situation to the first threshold value.

* * * * *